US011665009B2

(12) United States Patent
DeLapa et al.

(10) Patent No.: US 11,665,009 B2
(45) Date of Patent: May 30, 2023

(54) RESPONSIVE COMMUNICATION SYSTEM

(71) Applicant: Vocal Power-House Systems, LLC, Grand Rapids, MI (US)

(72) Inventors: James P. DeLapa, Grand Rapids, MI (US); Samuel-Hunter Berndt, Belding, MI (US)

(73) Assignee: Vocal Power-House Systems, LLC, Coloma, MI (US)

( * ) Notice: Subject to any disclaimer, the term of this patent is extended or adjusted under 35 U.S.C. 154(b) by 243 days.

(21) Appl. No.: 17/099,240

(22) Filed: Nov. 16, 2020

(65) Prior Publication Data

US 2021/0119817 A1    Apr. 22, 2021

Related U.S. Application Data

(63) Continuation-in-part of application No. 16/861,507, filed on Apr. 29, 2020, now Pat. No. 11,102,021,
(Continued)

(51) Int. Cl.
*H04L 12/18* (2006.01)
*H04M 3/56* (2006.01)

(52) U.S. Cl.
CPC ........ *H04L 12/1822* (2013.01); *H04M 3/562* (2013.01); *H04M 3/568* (2013.01)

(58) Field of Classification Search
None
See application file for complete search history.

(56) References Cited

U.S. PATENT DOCUMENTS

| 4,941,187 A | 7/1990 | Slater |
| 6,539,084 B1 | 3/2003 | Long |

(Continued)

FOREIGN PATENT DOCUMENTS

| WO | 2015158266 A1 | 10/2015 |
| WO | WO-2022016020 A1 * | 1/2022 |

OTHER PUBLICATIONS

International Search Report and Written Opinion of the International Searching Authority from corresponding Patent Cooperation Treaty (PCT) Application No. PCT/IB17/52779, indicated completed on Jul. 23, 2017.

*Primary Examiner* — Natisha D Cox
(74) *Attorney, Agent, or Firm* — Gardner, Linn, Burkhart & Ondersma LLP

(57) ABSTRACT

A spoken communication system and method of transferring spoken communication, includes a plurality of communication devices, at least some configured to be positioned within an occupied structure, each of said communication devices including a processor, a microphone an audio output device and a communication circuit and being responsive to spoken communication to communicate that spoken communication to other communication devices and to receive spoken communications received by other of said communication devices and an internet connected server. The server is selectively in digital communication with the communication devices and adapted to receive a spoken audio stream request, said server responsive to receiving an audio stream request by opening communication channels with said communication devices that are connected with said server. The server is adapted to receive spoken communication captured by one of said communication devices that is in communication with said server. The server is adapted to send the spoken communication to all other communication devices in digital communication with the server over the open communication channels with the other communication devices, wherein communication channels are open among said communication devices that are connected with said server to communicate spoken communication among communication devices that are connected with said server. The server is adapted when in a home mode to keep the communication channels open irrespective of the presence of (Continued)

speech over the communication channels. The server is adapted when not in the home mode to open the communication channels in response to a spoken awake word and to maintain the communication channels open only in the presence of speech over the communication channels.

27 Claims, 25 Drawing Sheets

Related U.S. Application Data which is a continuation of application No. 15/765,940, filed as application No. PCT/IB2017/052779 on May 11, 2017, now Pat. No. 10,666,448.

(60) Provisional application No. 62/379,528, filed on Aug. 25, 2016, provisional application No. 62/361,728, filed on Jul. 13, 2016.

(56) References Cited

U.S. PATENT DOCUMENTS

| | | | |
|---|---|---|---|
| 7,013,000 B2 | 3/2006 | Bortolini et al. | |
| 7,065,196 B2 | 6/2006 | Lee | |
| 7,075,918 B1 | 7/2006 | Kung et al. | |
| 7,085,361 B2 | 8/2006 | Thomas | |
| 7,683,924 B2 | 3/2010 | Oh et al. | |
| 9,049,306 B1 | 6/2015 | Gueorguieva et al. | |
| 9,065,927 B2 | 6/2015 | Schultz | |
| 9,113,052 B1 | 8/2015 | Scalisi et al. | |
| 9,270,931 B2 * | 2/2016 | Frankel | G06V 40/20 |
| 10,680,995 B1 * | 6/2020 | Hinkle | H04L 12/1813 |
| 2003/0207694 A1 | 11/2003 | Legare et al. | |
| 2004/0135686 A1 | 7/2004 | Parker | |
| 2007/0019571 A1 | 1/2007 | Stogel | |
| 2009/0022131 A1 | 1/2009 | Rusanen et al. | |
| 2009/0210227 A1 * | 8/2009 | Sugiyama | G10L 15/22 901/46 |
| 2009/0310762 A1 | 12/2009 | Velius | |
| 2010/0263047 A1 | 10/2010 | Denninghoff et al. | |
| 2010/0299385 A1 | 11/2010 | Root et al. | |
| 2011/0275348 A1 | 11/2011 | Clark et al. | |
| 2012/0093303 A1 * | 4/2012 | Schultz | H04M 1/72454 379/159 |
| 2013/0097303 A1 | 4/2013 | Gichana et al. | |
| 2013/0109425 A1 * | 5/2013 | Kerger | H04W 4/08 455/518 |
| 2013/0201316 A1 | 8/2013 | Binder et al. | |
| 2015/0077240 A1 | 3/2015 | Eck | |
| 2015/0179057 A1 | 6/2015 | Morimoto et al. | |
| 2015/0287026 A1 | 10/2015 | Yang et al. | |
| 2015/0304416 A1 | 10/2015 | Higashi | |
| 2015/0334336 A1 | 11/2015 | Chiu et al. | |
| 2016/0118036 A1 * | 4/2016 | Cheatham, III | H04M 11/025 380/252 |
| 2016/0155310 A1 * | 6/2016 | Joao | G16H 10/60 340/573.1 |
| 2016/0157074 A1 * | 6/2016 | Joao | G06F 16/29 455/404.2 |
| 2016/0191452 A1 | 6/2016 | Collins et al. | |
| 2016/0232429 A1 | 8/2016 | Park et al. | |
| 2016/0241720 A1 * | 8/2016 | Cheatham, III | G10K 11/17837 |
| 2016/0292408 A1 | 10/2016 | Zhang et al. | |
| 2019/0206411 A1 * | 7/2019 | Li | G06F 3/167 |
| 2019/0295542 A1 * | 9/2019 | Huang | G06F 3/167 |

* cited by examiner

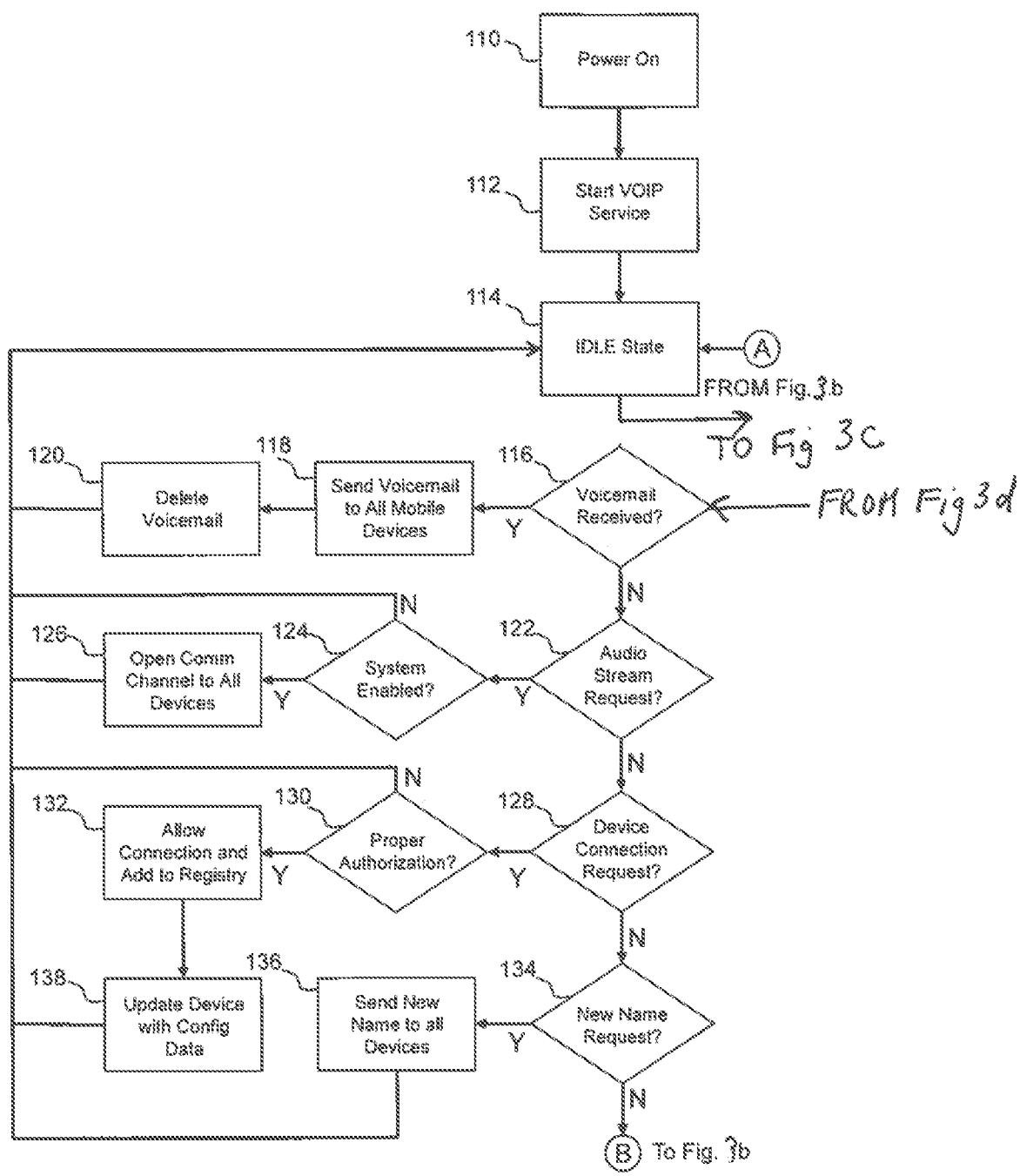

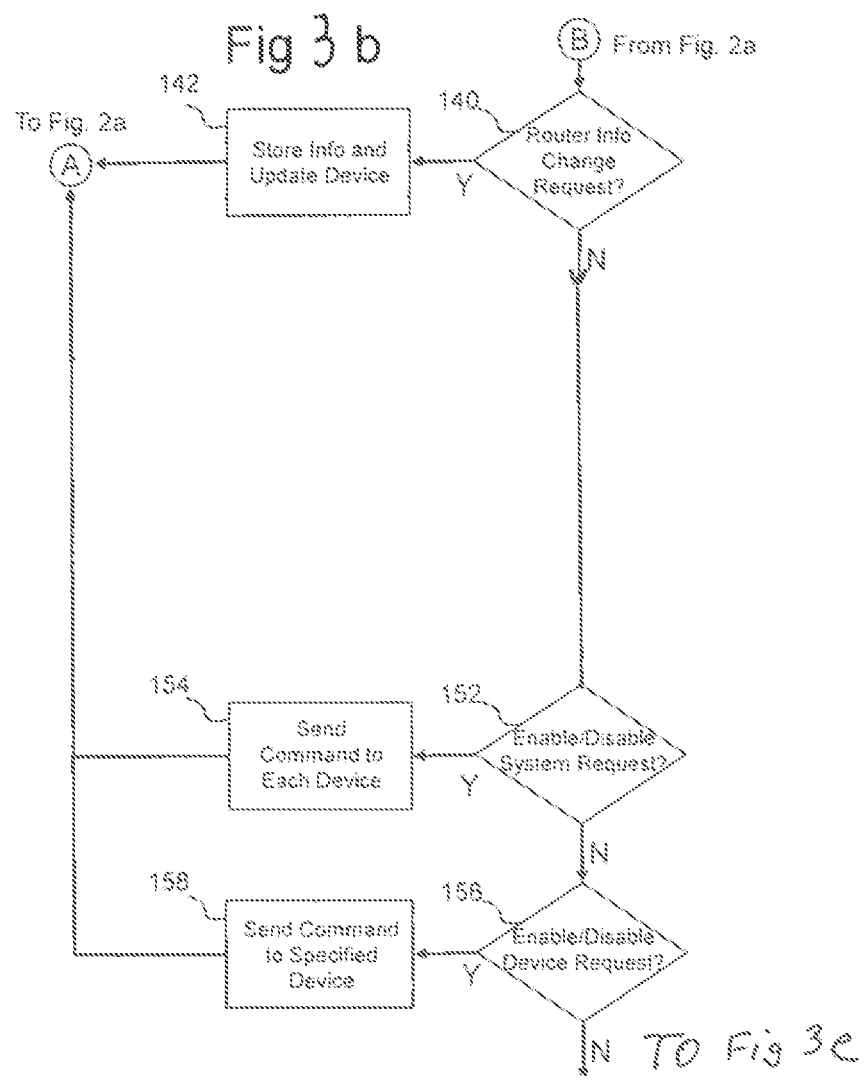

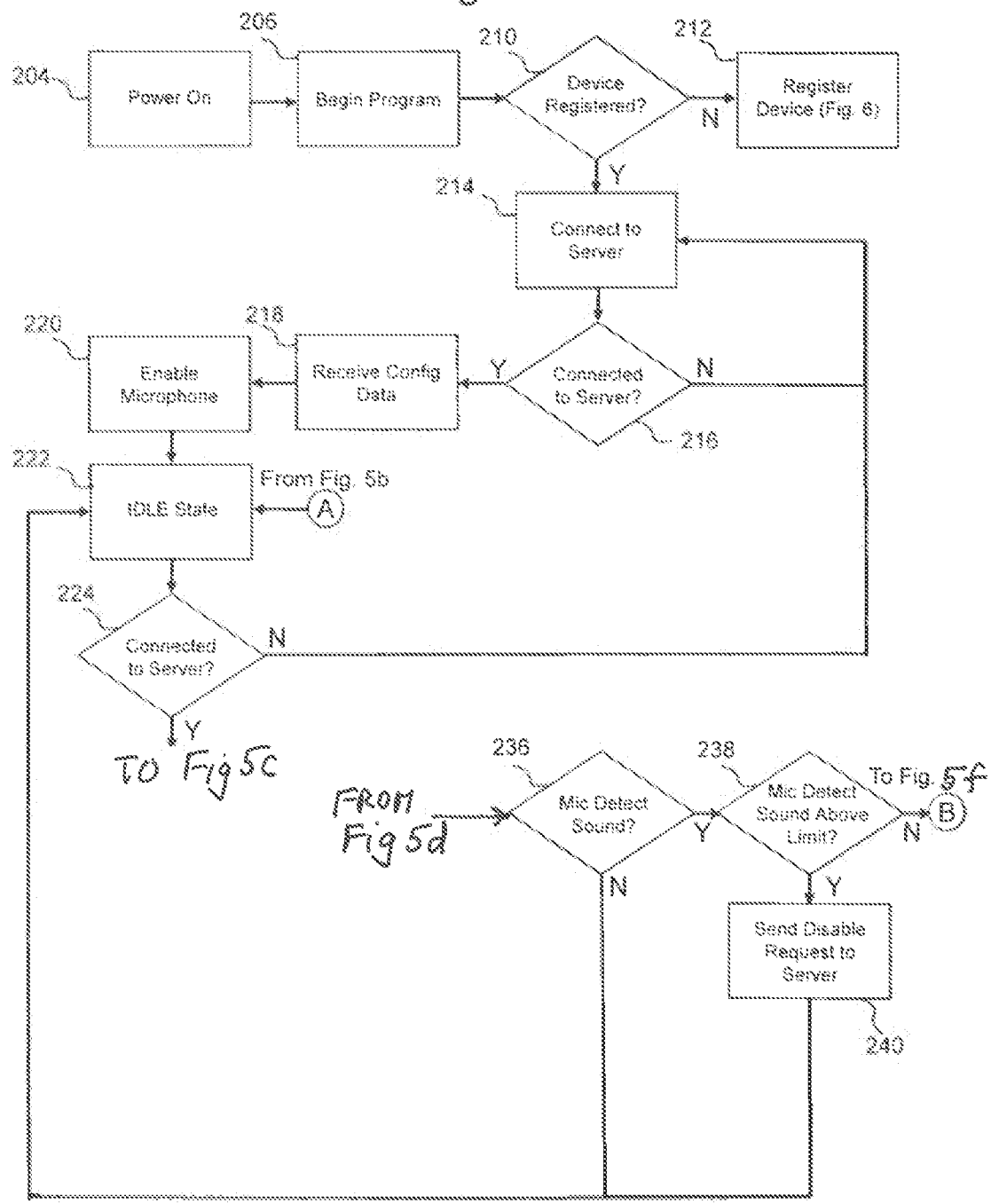

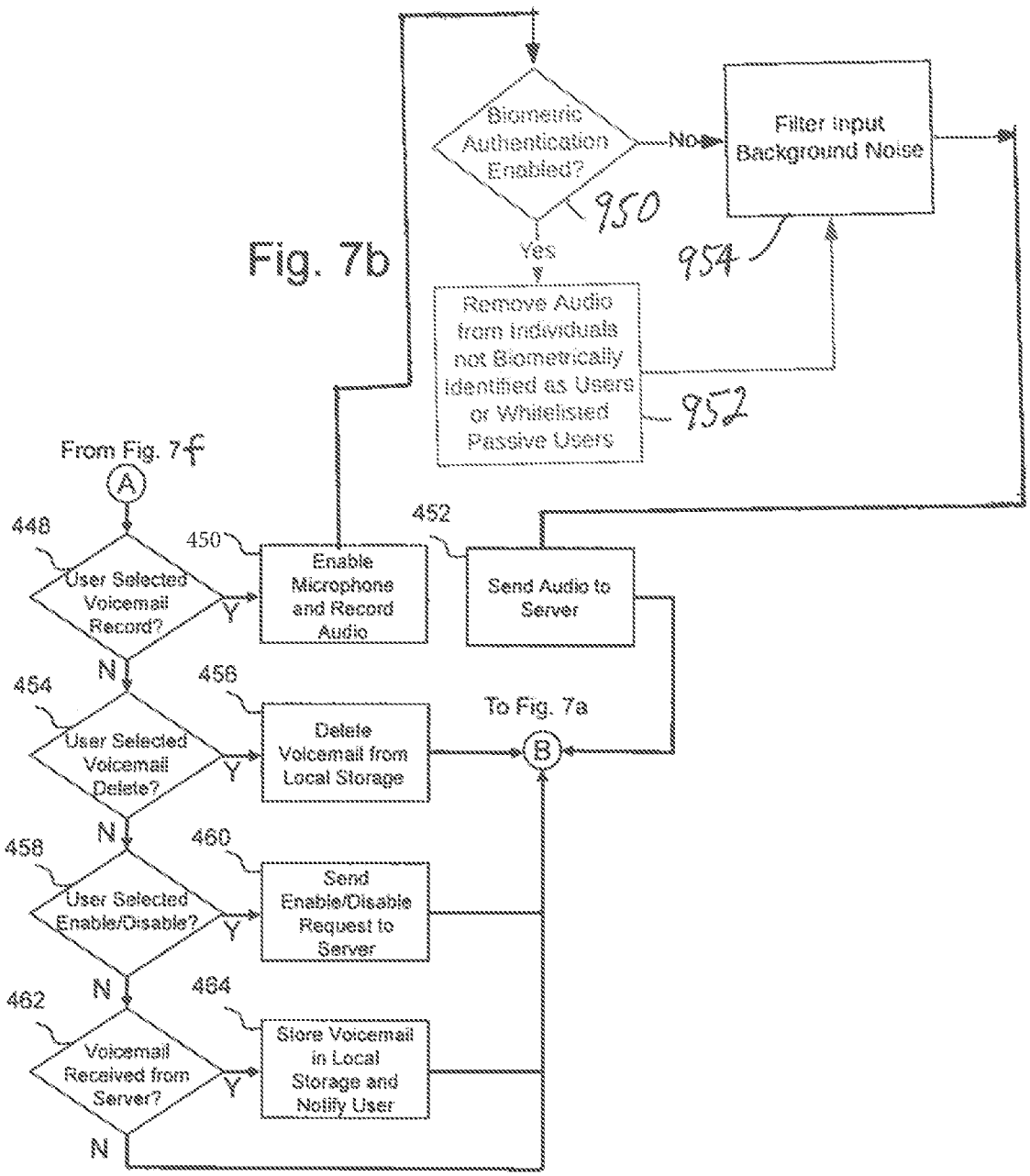

RESPONSIVE COMMUNICATION SYSTEM

CROSS-REFERENCES TO RELATED APPLICATIONS

The present application is a continuation-in-part of U.S. patent application Ser. No. 16/861,507, filed Apr. 29, 2020 by James P. DeLapa, Samuel-Hunter Berndt and Can Gokcek, entitled RESPONSIVE COMMUNICATION SYSTEM, which is a continuation of U.S. Pat. No. 10,666,448, issued May 26, 2020, which claims the benefit of International Patent Application No. PCT/IB2017/052779, filed May 11, 2017, which claims the benefit of U.S. Provisional Patent Application Ser. No. 62/379,528 filed Aug. 25, 2016 and U.S. Provisional Patent Application Ser. No. 62/361,728 filed Jul. 13, 2016.

BACKGROUND OF THE INVENTION

The present invention is directed to a communication system that is restricted to a community, such as a family or other unit, and, in particular, to a system that provides spoken, or oral, communication among family members. While the invention is capable of providing spoken communication within a residence, it is also capable of providing such communication among several residences and among several platforms for residents that are outside of the residence(s).

Currently, home communication systems are permanently installed wall-mounted fixtures, known as intercoms, which require the user to be located in front of the fixture, and press and hold a button while speaking into a microphone. The person to whom the communication is directed needs to be near a corresponding unit. Such units require hard-wired communication cable interconnecting the units, as well as a source of power.

Various web-enabled communication techniques are available. Some even pick-up casual conversations without the conscious knowledge of the users. Such techniques provide access to the communication by the service provider. The service provider is able, through permission given via the user agreement, to record conversations and to extract information about the users from the on-line communications sent to their computers to provide marketing pitches, and the like. Communications among family members are often very sensitive and most private, and recording of such communication is typically not desired.

SUMMARY OF THE INVENTION

A spoken communication system, according to an aspect of the invention, includes a plurality of devices and a server. Each of the devices are responsive to spoken communication, to communicate that spoken communication to other devices, and to receive spoken communications received by other devices. The server is in digital communication with the devices to communicate the spoken communication among the devices. The devices may include domestic devices that are adapted to be positioned on one or more residences, wearable device and hearing aid devices.

A communication channel is opened between the server and the devices. The communication channel can be opened in response to awake words, such as "Hey [spouse's name]" or the like as set up by the user. When opened in this fashion, the communication channel stays open as long as spoken communication is occurring. However, there are occasions when requiring the speaking of awake words is undesirable. For example, with small households with only a few occupants, it would be desirable to allow occupants to be able to speak with each other in a normal, natural and spontaneous manner without requiring speaking the awake word(s). Aspects of the present invention provide a "home" mode in which multi-directional communication can occur between occupants from distant locations in a residence without requiring awake words to be spoken. In the home mode, the communication channel remains open regardless of any activity over the channel. In other words, ongoing speaking is not required to keep the channel open in the home mode.

There may be times, however, where it may be desirable to temporarily interrupt home mode. For example, when individuals in a household are in close proximity so that they can speak directly without the need for the spoken communication system, the home mode feature may be automatically interrupted. Also, the home mode may be interrupted when a user initiates or receives a phone call from a third party. Also, the home mode can be terminated by voice command such as when there are guests present in the household and communication is desired to be kept private.

A spoken communication system and method of transferring spoken communication, according to an aspect of the invention, includes a plurality of communication devices, each comprising a processor, a microphone a speaker and a communication circuit and configured to be positioned within an occupied structure and being responsive to spoken communication to communicate that spoken communication to other communication devices and to receive spoken communications received by other of said communication devices and an internet connected server. The server is selectively in digital communication with the communication devices and adapted to receive a spoken audio stream request, said server responsive to receiving an audio stream request by opening communication channels with said communication devices that are connected with said server. The server is adapted to receive spoken communication captured by one of said communication devices that is in communication with said server. The server is adapted to send the spoken communication to all other communication devices in digital communication with the server over the open communication channels with the other communication devices, wherein communication channels are open among said communication devices that are connected with said server to communicate spoken communication among communication devices that are connected with said server. The server is adapted when in a home mode to keep the communication channels open irrespective of the presence of speech over the communication channels. The server is adapted when not in the home mode to open the communication channels in response to a spoken awake word and to maintain the communication channels open only in the presence of speech over the communication channels.

The system may be adapted to mute the communication channels in response to the proximity sensors of at least two of the communication devices indicate that the communication devices are within a defined proximity to each other. The communication devices may be stationary domestic devices, wearable devices and/or hearing aid devices. The server may be adapted to remove the spoken communication from storage after the spoken communication is sent to the speakers of all other communication devices having a communication channel with the server and the communication devices adapted to only keep spoken communication when requested by the user, wherein spoken communication is not kept permanently on the server or the communication devices wherein spoken communications by the users of the system are isolated from capture by systems on the Internet to thereby ensure privacy and security.

A spoken communication system and method of transferring spoken communication, according to an aspect of the invention, includes a plurality of communication devices, each comprising a processor, a microphone a speaker and a communication circuit and configured to be positioned within an occupied structure and being responsive to spoken communication to communicate that spoken communication to other communication devices and to receive spoken communications received by other of said communication devices and an Internet connected server. The server is selectively in digital communication with the communication devices and adapted to receive a spoken audio stream request, said server responsive to receiving an audio stream request by opening communication channels with said communication devices that are connected with said server. The server is adapted to receive spoken communication captured by one of said communication devices that is in communication with said server. The server is adapted to send the spoken communication to all other communication devices in digital communication with the server over the open communication channels with the other communication devices, wherein communication channels are open among said communication devices that are connected with said server to communicate spoken communication among communication devices that are connected with said server. Each of the communication devices includes at least one proximity sensor that is adapted to sense location of users relative to that communication device.

The system may be adapted to temporarily mute the communication channel in response to the proximity sensors of a device indicating that there is more than one user within a defined proximity to each other. The system may alternatively be adapted to enter a playback mode, where the device will playback audio it is receiving at the device, in response to the proximity sensor of a device indicating there is more than one user within a defined proximity to each other. The system may alternatively be adapted to allow all users within the proximity of the device to communicate over the open communication channel. The system may be adapted to detect that communication from an individual user is being transmitted over more than one communication device over a single communication channel; the server may be adapted to detect the device which is transmitting the highest quality audio from the individual user and mute the audio from that individual user on the other of said devices in order to prevent feedback. The server may be adapted to mute a spoken communication from a communication device by inverting sound waves generated by the speaker of that communication device. The system may be adapted to detect spoken communication volume and adjust input microphone gain and/or output volume of the relevant communication devices in response to the separation distance between a speaker and/or intended listener and the communication device as indicated by the proximity sensors of said communication devices.

A spoken communication system and method of transferring spoken communication, according to an aspect of the invention, includes a plurality of communication devices, each comprising a processor, a microphone a speaker and a communication circuit and configured to be positioned within an occupied structure and being responsive to spoken communication to communicate that spoken communication to other communication devices and to receive spoken communications received by other of said communication devices and an internet connected server. The server is selectively in digital communication with the communication devices and adapted to receive a spoken audio stream request, said server responsive to receiving an audio stream request by opening communication channels with said communication devices that are connected with said server. The server is adapted to receive spoken communication captured by one of said communication devices that is in communication with said server. The server is adapted to send the spoken communication to all other communication devices in digital communication with the server over the open communication channels with the other communication devices, wherein communication channels are open among said communication devices that are connected with said server to communicate spoken communication among communication devices that are connected with said server. The system identifies individual users at the communication devices.

The system may be adapted to identify individuals at a communication device according to a biological feature of the individual. The biological feature may be gait, vocal output, iris image, facial image, eye movements, hand gestures, body gestures and/or finger print. Each communication device may be responsive to spoken communication to capture the spoken communication from only authenticated users, and be capable of sending the spoken communication from an authenticated user to other communication devices and receiving spoken communication from other of the communication devices from only authenticated users and the users identified according to the biological feature of the individual. A user may be an authorized user if on a whitelist of individuals and not an authorized user if on a blacklist of individuals. The system may disable communication channels to a communication device closest to a user receiving a phone call from an individual on the blacklist of individuals. The system may be adapted to allow a user to open a communication channel from a communication device to a specific user at another communication device using the biological features sensed by the communication devices as a function of the communication devices closest to the specific user and audio quality of those communication devices. The system may be adapted to allow a user to open communication channels from a communication device to a plurality of specific users at other communication devices using the biological feature sensed by the communication devices as a function of the communication devices closes to the specific users and audio quality of those communication devices. The other communication devices receiving an open communication channel may be changed in response to movement of the specific user or users.

These and other objects, advantages, purposes and features of this invention will become apparent upon review of the following specification in conjunction with the drawings.

BRIEF DESCRIPTION OF THE DRAWINGS

FIG. 3a is a flowchart of a server program;

FIG. 3b is a continuation of the flowchart found in FIG. 3a;

FIG. 5a is a more detailed flowchart of a domestic device program, a wearable device program or a hearing aid device program;

FIG. 5b is a continuation of the flowchart found in FIG. 5a;

FIG. 7b is a continuation of the flowchart found in FIG. 7a;

DESCRIPTION OF THE PREFERRED EMBODIMENT

Figure 1:
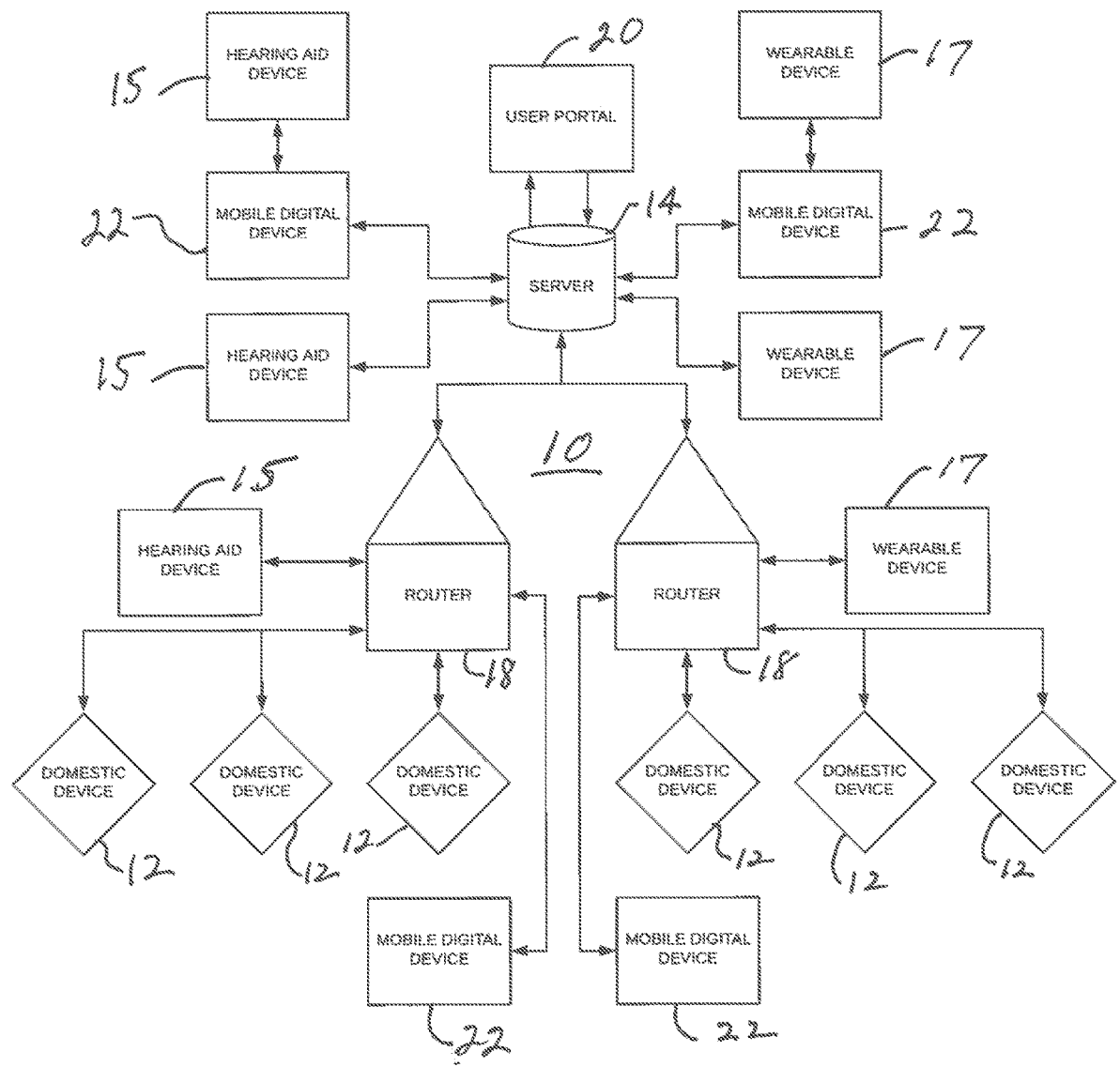
FIG. 1 is a block diagram of a spoken communication system, according to an embodiment of the invention.

Referring now to the drawings and the illustrative embodiments depicted therein, FIG. 1 depicts a spoken communication system 10 may optionally include at least one domestic device 12, optionally at least one mobile device 22, optionally at least one wearable device 17, and optionally at least one hearing aid device 15 (collectively referred to as "communication devices"), each being responsive to spoken communication to communicate that spoken communication to other domestic devices 12, mobile devices 22, wearable devices 17, and hearing aid devices 15. The spoken communication system further includes a server 14 in digital communication with the domestic devices 12, mobile devices 22, wearable devices 17, and hearing aid devices 15. As will be described in more detail below, server 14 may be restricted to communicate with only registered devices that are registered with server 14. Domestic devices 12, mobile devices 22, wearable devices 17, hearing aids 15 may be activated by a variable or set command phrase and may only respond to authenticated users. In contrast to known voice-activated appliances that are web-enabled, communication system 10 ensures that spoken communications are discarded and never kept permanently on the server 14, and are only kept on devices when requested by the user (e.g., voice mail messages), which can be immediately and permanently deleted by the user. However, spoken communication system 10 still provides clear and near instantaneous communication among residents wherever located in one or more commonly shared residences or even outside the residences. For example, communication spoken within a reasonable distance of the domestic device 12 may be communicated. This may be accomplished by voice or biometric activation without the need to operate controls or otherwise require physical interaction with the system. However, system 10 has flexibility that allows system 10, domestic devices 12, mobile devices 22, wearable devices 17, and hearing aid devices 15 to be temporarily muted if it is desired to limit the extent of the communication transmission.

Spoken communication system 10 may include a plurality of routers 18 in digital communication with server 14. One or more domestic devices 12, mobile devices 22, wearable devices 17, and hearing aid devices 15 may be in digital communication with each of the routers 18. This use of routers facilitates, for example, domestic devices 12 in communication with one of the routers 18 in a residence, such as a primary residence being in digital communication with domestic devices 12 in communication with another of the router 18 in a different residence, such as a second residence.

The term "digital communication" can be via wireless Wi-Fi, wired Ethernet, Bluetooth, 3G, 4G, LTE cellular networks, radio, or other forms of digital communication known in the art. All such protocols are intended to be included in the term digital communication unless a particular protocol is specified. As such, a router is not necessary to facilitate communication between the set of devices and the server. All digital communication in the spoken communication system, including digital communication to and from the server 14, domestic devices 12, mobile devices 22, wearable devices 17, and hearing aid devices 15 may be encrypted for further privacy and security. Server 14 may be a physical server of the type that may be physically located in a residence or may be a logical server defined from a cloud web service of the type known in the art. Server 14 is managed though a website or user management portal 20, which may be accessed through any number of means, such as through a browser, or an application on a mobile phone or tablet.

One or more mobile devices 22 may be in digital communication with server 14. Mobile devices 22 are devices that are web-enabled to communicate via a cellular network or other wireless network, such as a smart phone, tablet, or the like and include at least a speaker and a microphone. Mobile device 22 may receive spoken communication from one of domestic devices 12, wearable devices 17, and/or hearing aid devices 15 via server 14 and transfer spoken communication to domestic devices, mobile devices, wearable devices, and/or hearing aid device. This allows system 10 to communicate spoken communication to a user who is out of the residence without the need to place a call to that user or receive a call from that user. Thereby, seamless spoken communication can be provided hands-free from inside the residence to and from a community user not within range of a connected device [12, 22, 15, 17]. A community user is a user that is a member of a family or other community and has permission to be a user of the system.

System Overview:

One or more wearable devices may be in digital communication with the server 14. Wearable devices are devices that are web-enabled to communicate via a cellular network, router, or other wireless network, including sharing the network capabilities of a paired smart phone, tablet, or the like. Wearable devices may include at least one speaker, microphone, a Wi-Fi interface, an interactive screen, and a camera. Similar to domestic devices 12, wearable devices may send or receive spoken communication to any of the other devices, including domestic devices 12, mobile devices 22, hearing aid devices 15, or other wearable devices 17. Thus, wearable devices share all the functionality of domestic devices 12. This allows system 10 to communicate spoken communication to user(s) who are in or out of the residence without the use of mobile phones. Thereby, hands-free spoken communication may take place between users with any number of system 10 connected devices regardless of a user's location.

One or more hearing aid devices 15 may be in digital communication with the server 14. Hearing aid devices are small devices that fit within or around a user's ear designed to amplify sound surrounding a user in addition to send and receive spoken communication between any of the devices, including domestic devices 12, mobile devices 22, wearable devices 17, or hearing aid devices 15, in system 10. Hearing aid devices are web-enabled and may communicate via a cellular network, router, or other wireless network, including sharing the network capabilities of a paired smart phone, tablet, or the like. Hearing aid devices act as domestic devices but with proximity based amplification and playback defaulted on. This allows system 10 to communicate spoken communication to and from user(s) who may be hard of hearing regardless of the user's location and their access to other devices.

Figure 3C:
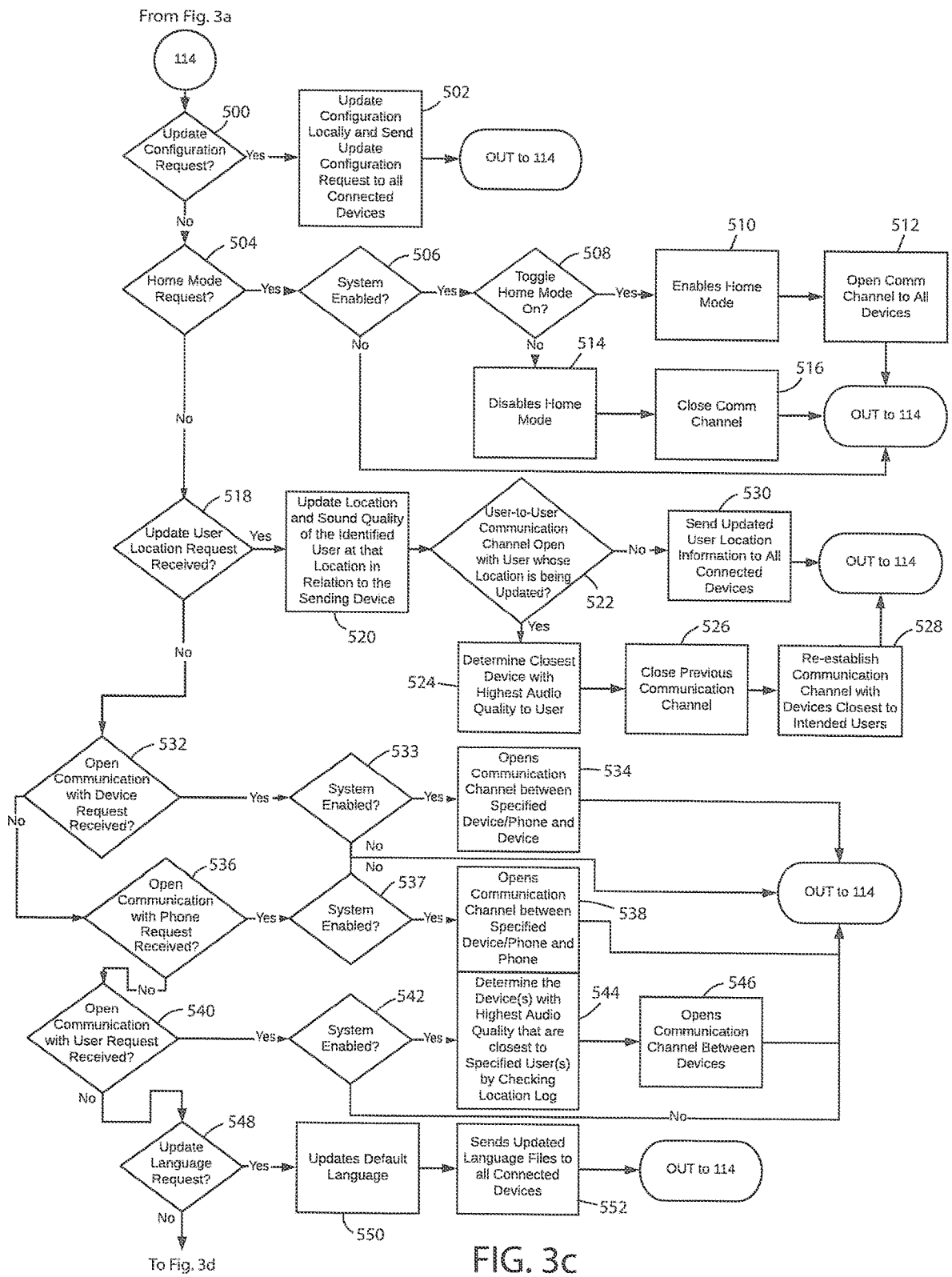
FIG. 3c is a continuation of the flowchart found in FIG. 3b.
Figure 3D:
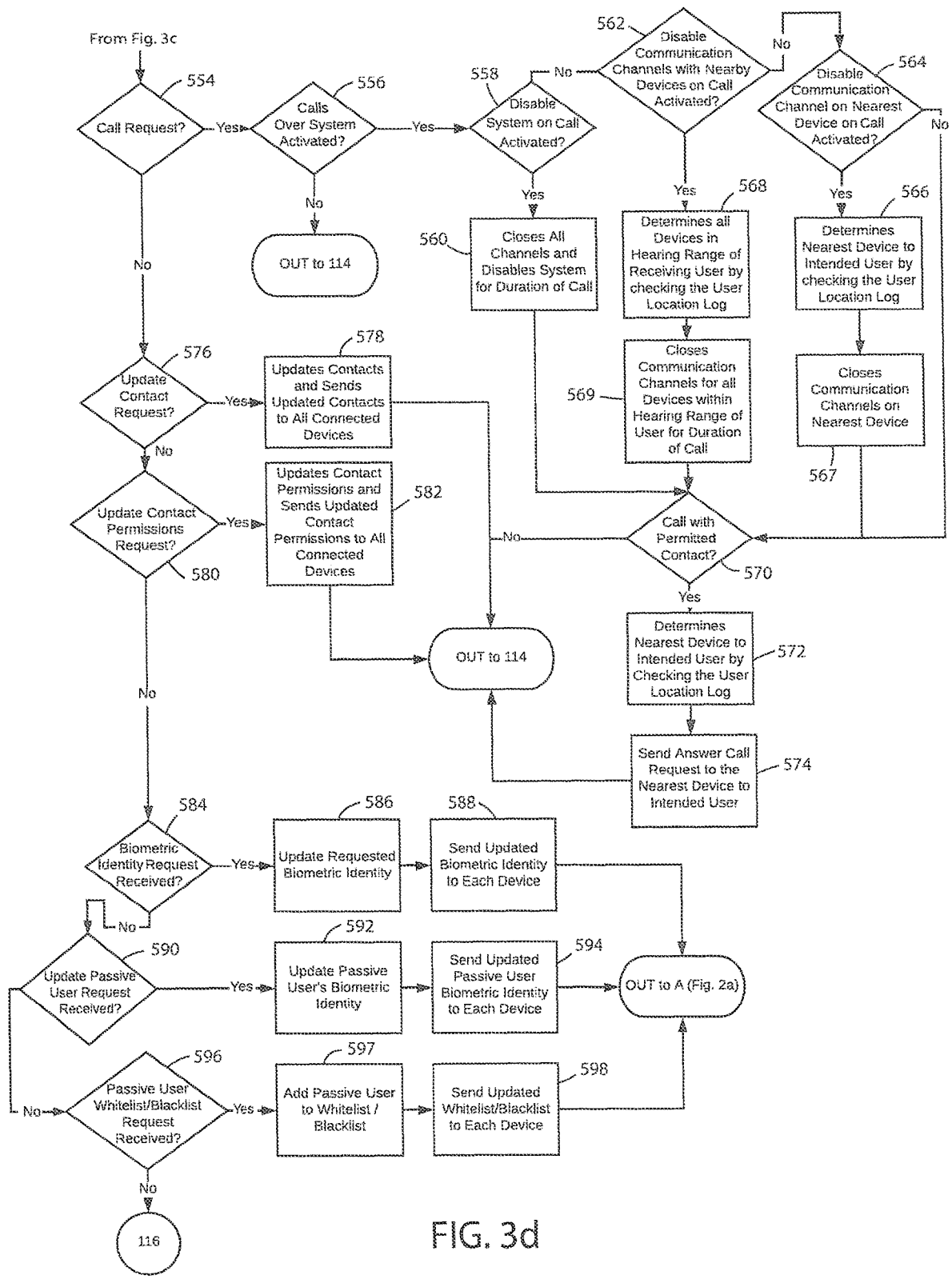
FIG. 3d is a continuation of the flowchart found in FIG. 3c.
Figure 3E:
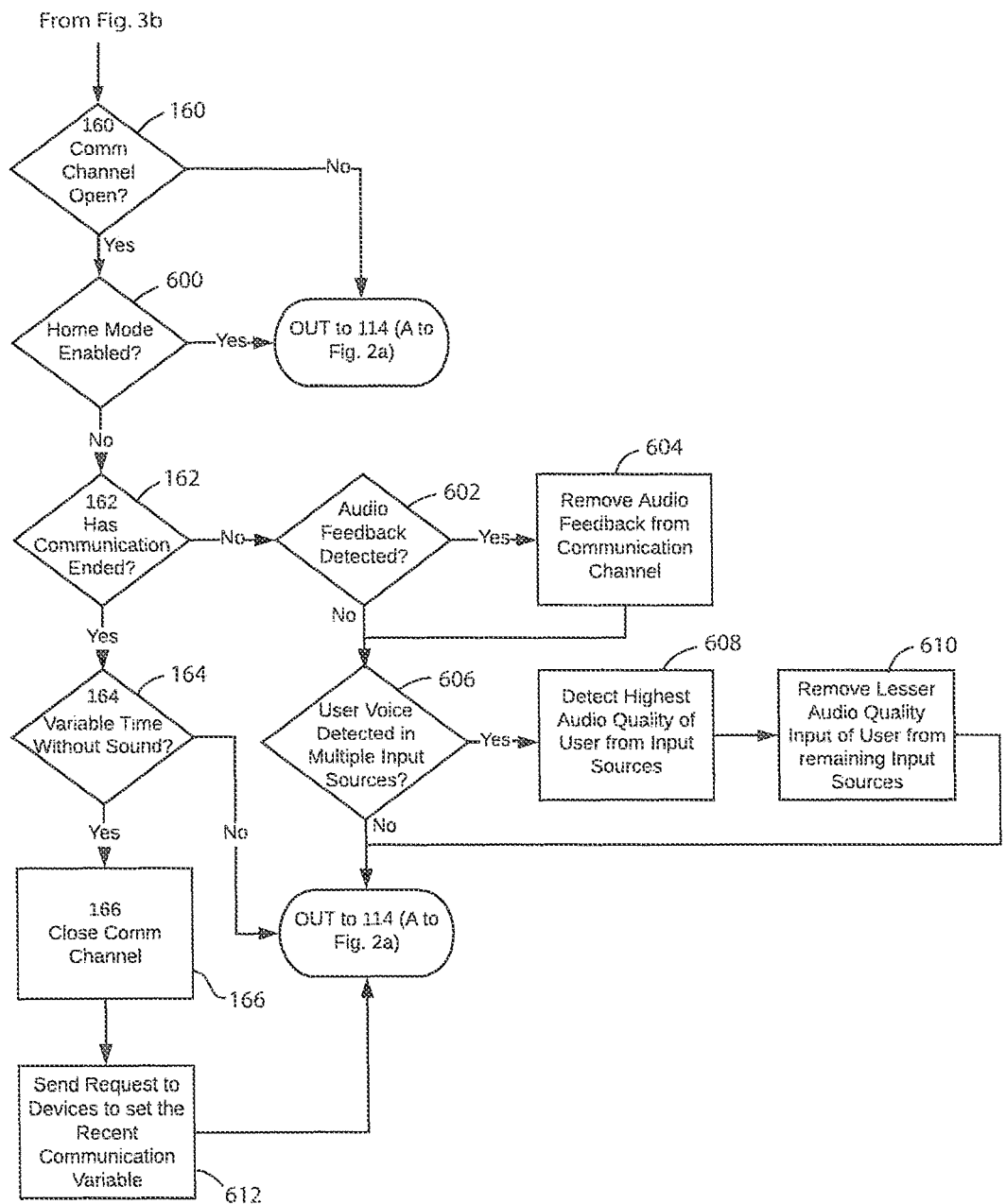
FIG. 3e is a continuation of the flowchart found in FIG. 3d.
Figure 4:
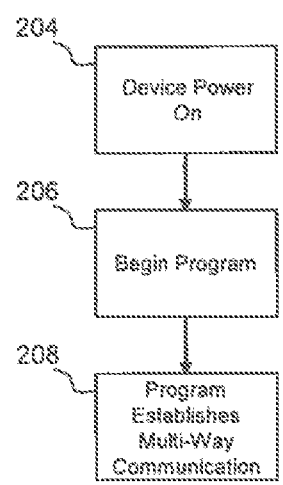
FIG. 4 is an initiation flowchart of a domestic device, a wearable device, or a hearing aid device.

Turning to FIG. 3a, a server 14 facilities the transfer of spoken communication between each domestic device 12 and each mobile device 22. After the server 14 powers on at 110, the server 14 may start a Voice over IP (VOIP) service at 112. The server 14 then enters an idle state at 114, wherein the server 14 waits for spoken communication from a domestic device 12 or a mobile device 22.

Configuration Information:

While in the idle state at 114, the server 14 will determine if it has received an update configuration request 500. If the server 14 has received an update configuration request, the server 14 will update its configuration settings locally at 502 and send the updated configuration information to all connected devices [12, 22, 17, 15] before exiting back to its idle state 114. Configuration requests may include updates to proximity settings, wireless settings, or other system settings.

Home Mode:

If the server 14 determines it did not receive a update configuration request 500, the server 14 will check if it received a Home Mode Request 504. If so, it will check if the system is currently enabled at 506. If the system 14 is enabled the server 14 will determine if the request is toggling Home Mode on at 508. If the request is toggling Home Mode on the server 14 will enable Home Mode at 510 and open a communication channel to all of the devices [12, 22, 17, 15] at 512 before exiting to the idle state at 114. Home Mode is a setting that disables the timeout for communication effectively leaving the communication channel open at all times. By having Home Mode enabled, community users are able to effortlessly communicate with one another as though they are in the same room without having to reinitiate conversation using other awake words. If the request is toggling Home Mode off at 508, the server 14 will disable Home Mode at 514 and close the communication channel at 516 before exiting to the idle state at 114. If after receiving the Home Mode request at 504, the server 14 determines that the system is disabled at 506, the server will ignore the Home Mode request and go back to the server 14 idle state 114.

User Proximity:

If the server 14 determines it did not receive a Home Mode Request 504, the server 14 will check if it received an Update User Location Request 518. If so, the server 14 will update the location and sound quality of the identified user at that location in relation to the sending device 520. If the server 14 determines a User-to-User Communication Channel is Open with the User in the Update User Location Request 522 the server will determine the closest communication device [12, 22, 17, 15] with the highest audio quality to the User at 524, close the previous user-to-user communication channel at 526, and re-establish a communication channel with the communication devices [12, 22, 17, 15 ] closest to the intended users at 528 before exiting to the server 14 idle state at 114. This thereby ensuring that when user-to-user communication is occurring the communication devices that are closest to the intended users and have the highest sound quality will be the devices [12, 22, 17, 15 ] which are active in the user-to-use communication channel. If a User-to-User communication channel is not open with the user in the request 522, the server 14 will send the updated user location information to all the devices connected to the server 14 at 530 before exiting back to its idle state at 114.

Open Communication Devices/Users:

If the server 14 determines it did not receive an Update User Location Request 518, the server 14 will check if it received an Open Communication with Device Request at 532. If so, the server 14 will check if the system 10 is enabled at 533. If so, the server 14 will open a communication channel between the specified Device/Phone [12, 22, 17, 15] and the requested device [12, 22, 17, 15 ] at 534 before returning to the server 14 idle state at 114; enabling communication with individual devices [12, 22, 17, 15 ] from any given device [12, 22, 17, 15]. If the server 14 determines that the system 10 is disabled at 533 the server 14 returns to its idle state at 114. If the server 14 determines that it did not receive an Open Communication with Device Request at 532, the server 14 checks if it received an Open Communication with Phone Request at 538. If so, the server 14 will check if the system 10 is enabled at 537. If so, the server will open a communication channel between the specified device/phone [12, 22, 17, 15] and the requested phone 22 at 538; thus enabling communication with individual phones over the communication system 10. If the system 10 is disabled at 537] the server 14 goes back to its idle state at 114. If the server 14 determines it did not receive an Open Communication with Phone Request at 536, the server 14 will check if it received an Open Communication with User Request at 540. If so, the server 14 will check if the system 10 is enabled at 542. If the system 10 is enabled at 542, the server 14 will check its Location Log to determine the device(s) with the highest audio quality for the intended users at 544 and open a communication channel between those devices at 546 before returning to the server 14 idle state at 114. Thus enabling person-to-person communication over a plurality of devices with the devices which are closest to the intended user ensuring the highest quality audio. If the server 14 determines at 542 that the system 10 is disabled it will return to the server 14 idle state at 114.

Native Language:

If the server 14 determines that it did not receive an Open Communication with User Request 540, the server 14 will determine if it received an Update Language Request 548. If so, the server will update the default language at 550 and send the updated language files, including dictionaries, activation words, and the like, to all of the connected devices [12, 22,17, 15] at 552 before returning to the server 14 idle state at 114. Thereby enabling the communication system 10 to be available worldwide in any given language.

Calls:

If the server 14 determines that it did not receive an updated language request at 548 the server 14 will determine if it received a Call Request at 554. If so, the server 14 will determine if calls are permitted over the system via a configuration setting at 556. If calls are not permitted over the system at 556 the server 14 will ignore the request and return to its idle state at 114. If calls are permitted over the system 10, the server 14 will determine if a user previously set the system 10 to be disabled if a call is active at 558. If so, at 560 the server will close all communication channels and disable the system 10 for the duration of the call. If the server 14 determines that the call is with a permitted contact at 570, the server 14 will determine the nearest device [12, 22, 17, 15] to the call's intended user by checking the User Location Log at 572. Once finding the nearest device [12, 22, 17, 15], the server will send an Answer Call request to the nearest device at 574 before returning to the server 14 idle state 114.

If, rather a User previously decided to disable communication channels with nearby devices at 556 rather than the whole system at 558, the server 14 will determine all the devices [12, 22, 17, 15] within hearing range of the call's intended user at 568 and at 569 close the communication channels with those devices for the duration of the call. If the server 14 determines that the call is with a permitted contact at 570 the server 14 at 572 will check the User Location Log to determine the closest device to the call's intended User and at 574 send an Answer Call Request to that device [12, 22, 17, 15] returning to the idle state 114. If a User had decided to disable the communication channels on the nearest device when a call is activated at 564 rather than all the nearest devices at 562, at 566 the server 14 will determine the nearest device to the call's intended User and close the communication channels on that device [12, 22, 17, 15] at 567. The server 14 will then determine if the call is with a permitted contact at 570, and if so, will determine the nearest device to the call's intended user at 572 and at 574 send an Answer Call Request to that device before returning to the idle state at 114. If in any of these cases after having disabled the appropriate system 10 or devices [12, 22, 17, 15] the server 14 determines that the call is not with a permitted contact at 570 the server 14 will return to its idle state at 114. If the server 14 did not receive a Call Request at 554, the server 14 will check if it received an Update Contact Request at 576. If so, the server will update the contacts and send the updated contact list to all the connected devices [12, 22, 17, 15] before returning to the idle state at 114. If the server 14 did not receive an Update Contact Request at 576 and rather received an Update Contact Permissions Request at 580, the server 14 will update the contact permissions and send the updated contact permissions to all connected devices at 582 before returning to the server 14 idle state at 114.

Biometric Registration:

If the server 14 determines there is no Update Contact Permissions Request at 590 the server 14 determines if it received a Biometric Identity Request at 584. If so, the server 14 updates the requested biometric identity at 586, and then sends the updated biometric identity to each device [12, 22, 17, 15] at 588 before returning to the server 14 idle state at 114. By storing and constantly updating user's biometric identities at 588 the system 10 will be able to verify that when a user issues a spoken command, the device [12, 22, 17, 15] or the server 14 may verify that the user is an authenticated user by comparing that user with previously stored biometric profiles. This ensures that only authenticated users are able to communicate over the system 10. In addition, tracking the user's biometric profiles enables other features such as proximity based communication. If the server 14 did not receive a Biometric Identity Request at 584, the server 14 will check if it received an Update Passive User Request at 590. If so, the server 14 will update the requested passive user's biometric identity at 592, send the updated biometric identity to each device [12, 22, 17, 15] at 594, and then return to the server 14 idle state at 114. By storing passive users in the system 10 the system will allow various levels of permissions for communicating over the system. If the server 14 did not receive an Update Passive User Request at 590, the server 14 will check if it received a Passive User Whitelist/Blacklist Request at 596. If so, the server will add the Passive User to the respective whitelist or blacklist at 597, at 598 send the updated whitelist or blacklist to each connected device, and then return to the server 14 idle state at 114; thus enabling permission levels for passive users to communicate over the system.

If the server did not receive a Passive User Whitelist/Blacklist request at 596, the server 14 will determine if it has received a voicemail at 116. If the server 14 has received a voicemail, the server 14 will send the voicemail at 118 to all mobile devices 22 connected to the server 14. After sending the voicemail, the server 14 will completely delete the voicemail at 120 from the server 14. This helps ensure the security and privacy of the spoken communications. The server 14 will then return to the idle state at 114.

If the server 14 determines it has not received a voicemail, the server 14 will next determine if it has received an audio stream request at 122. If the server 14 has received an audio stream request, the server 14 will next determine if the system is enabled at 124. If the system 10 is not enabled, the server 14 will return to the idle state at 114. If the system 10 is enabled, the server will open a communication channel at 126 to all devices connected to server 14. The server 14 will then return to the idle state at 114.

If the server 14 determines that it has not received an audio stream request, the server 14 will next determine if a device is requesting connection at 128 to server 14. If a domestic device or a mobile device is requesting connection, the server 14 will determine if the device provides proper authorization at 130. If the server 14 determines that the device did not provide proper authorization, the server 14 returns to the idle state at 114. If the device does provide proper authorization, the server 14 allows the connection and adds the device to the server registry at 132. The server 14 then sends configuration data to the device at 138. This configuration data comprises all the data the device requires to begin functioning. This data may include vocal profiles, system status, and other relevant information. The server 14 then returns to the idle state at 114.

If the server 14 determines that a device is not requesting a connection, the server 14 next determines if a new user name is being defined at 134. If a new user name is being defined, the server 14 adds the new user name to a database stored on the server and sends the new user name to all devices at 136 connected to the server 14. The server 14 then returns to the idle state at 114.

Turning now to FIG. 3b, if the server 14 determines that a new user name is not being defined, the server 14 determines if a mobile device 22 or user portal 20 is requesting to update router information at 140. This router information includes any information relevant to the server 14 or a device identifying or communicating with the router, such as IP address, MAC address, or the like. If a request to update router information is received, the server 14 will store the updated information and update all necessary devices at 142. The server will then return to idle at 114.

If the server 14 determines a router information request is not occurring, the server 14 then determines if the system 10 is being enabled or disabled at 152. If the server 14 determines that the system 10 is being enabled or disabled, the server 14 sends the appropriate enable or disable command to each connected device at 154. The server 14 then returns to the idle state at 114.

If the server determines that the system 10 is not being enabled or disabled, then the server determines if a device is being enabled or disabled at 156. If the server 14 determines that a device is being enabled or disabled, the server 14 sends the appropriate enable or disable command to the specified device at 158. The server 14 then returns to the idle state at 114.

If the server determines that a device is not being enabled or disabled, the server 14 then determines if a communication channel is open. If the server 14 determines that a communication channel is not open, the server returns to the idle state at 114.

Home Mode:

If the server 14 determines that a communication channel is open, the server 14 will check if Home Mode is enabled at 600. If Home Mode is enabled, the intent is to leave the server 14 open regardless if users are communicating in order to facilitate seamless communication and thus the server 14 will go back to its idle state at 114 leaving the communication channel open.

Audio Feedback:

If Home Mode is not enabled at 600, the server will check if communication has ended at 162. The server 14 may accomplish this by measuring the sound volume received against the typical ambient sound levels. The server 14 may also accomplish this by using natural language processing and determining the intent of a user's words are to end a conversation. If the server 14 detects spoken communication and determines that the conversation between users is still ongoing the server will check if there is any audio feedback, such as the looping of sounds from speaker to microphone, in the audio stream at 602. If there is audio feedback, the server will remove the audio feedback from the communication channel at 604. Regardless of the occurrence of audio feedback, the server 14 will then determine if it detects a single user's voice in multiple input sources at 606 by using their biometric profile. If a user's voice is detected in multiple input sources the server 14 would detect which input source has the highest quality audio of that user's voice at 608 and remove that user's voice from all other audio input sources at 610 thus enhancing the overall audio stream. After determining if a user's voice is in multiple input sources, and if necessary performing the aforementioned post-processing, the server 14 will return to its idle state at 114.

NLP Correction Variable:

If the server 14 detects that communication has ended at 162, the server 14 then determines if a variable amount of time has elapsed without spoken communication at 164. This variable time can be adjusted for the optimum time for the users of the system 10. If the server 14 determines that a variable amount of time has not passed, then the server 14 will return to the idle state at 114. If the server 14 determines that a variable amount of time has passed, the server 14 determines that the conversation between users has ended and closes the communication channel at 166. The server 14 then sends a request to all connected devices at 612 to set the recent communication variable to true, enabling the possibility to correct an accidentally closed communication channel from the devices end, before returning to the idle state at 114.

Figure 2A:
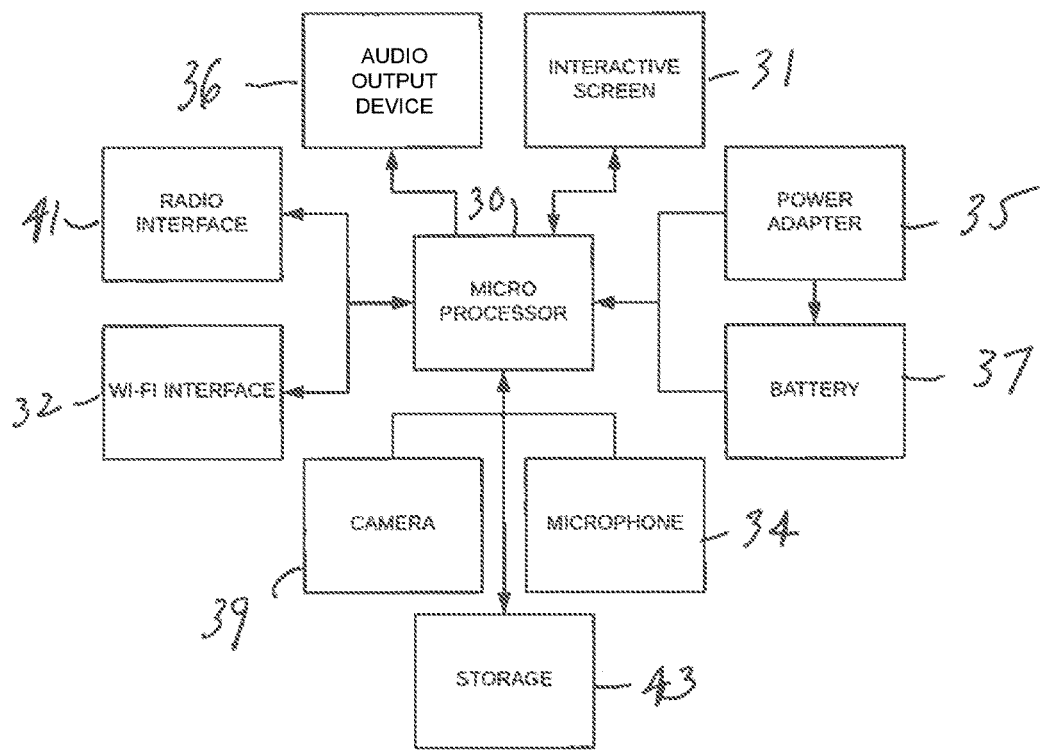
FIG. 2a is a block diagram of a domestic device.

Domestic Device Configuration:

Turning to FIG. 2*a*, domestic devices 12 include a processor 30, such as a micro-processor, programmable gate array, or the like. Domestic devices 12 may include multiple processors for performance or other benefits. Domestic devices also include a Wi-Fi interface defined by a Wi-Fi Interface 32, at least one microphone input 34, which may be an omni-directional microphone, to processor 30, and at least one speaker, which may be an omni-directional speaker, 36 annunciating audio output. The domestic device 12 may include multiple microphones or speakers for noise cancellation, stereo output, and the like. The domestic device 12 may have a power adapter 35 to be charged via an electrical outlet. The domestic device 12 may also include a rechargeable battery 37 that is rechargeable by plugging the device into an electrical outlet. The domestic device 12 may also be equipped with an interactive screen 31 in order to modify configuration settings, activate a communication channel, or the like. The domestic device 12 may also be equipped with a camera 39, where the camera may be an infrared camera, visible light camera, or accept any other light as input. The camera 39 may be used for biometrically identifying users or passive users, acting as a proximity sensor, and/or acting as a security camera. The domestic device 12 may also include a radio antenna 41 as a means to connect to a server via a radio interface. It is understood that this is a non-limiting example of a device 12 components. Domestic devices 12 may or may not utilize any number of other common computer processing components in order to facilitate sending and receiving spoken communication. Some examples could be RAM, nonvolatile storage 43, or other common communication and proceeding elements. Processor 30 executes a voice activation program that is responsive to audio input having a particular characteristic for communicating that audio input to at least one other of the devices. Any device with the suitable hardware, such as a wearable device or hearing aid, (speaker, microphone, etc.) may be used as a domestic device and to execute the domestic device program. This includes many popular "smart speakers" on the market today, such as Amazon Echo and Google Home. The domestic device program is described in detail below. The program may be updated or transferred to the domestic device 12 in any number of ways. For example, a USB memory device may be provided to supply the program or other code to the processor 30, such as via a USB slot. The program may also be updated via the wireless connection. Domestic devices 12 are adapted to be positioned within a residence, such as attached to a wall, supported from a table, or the like.

Figure 2B:
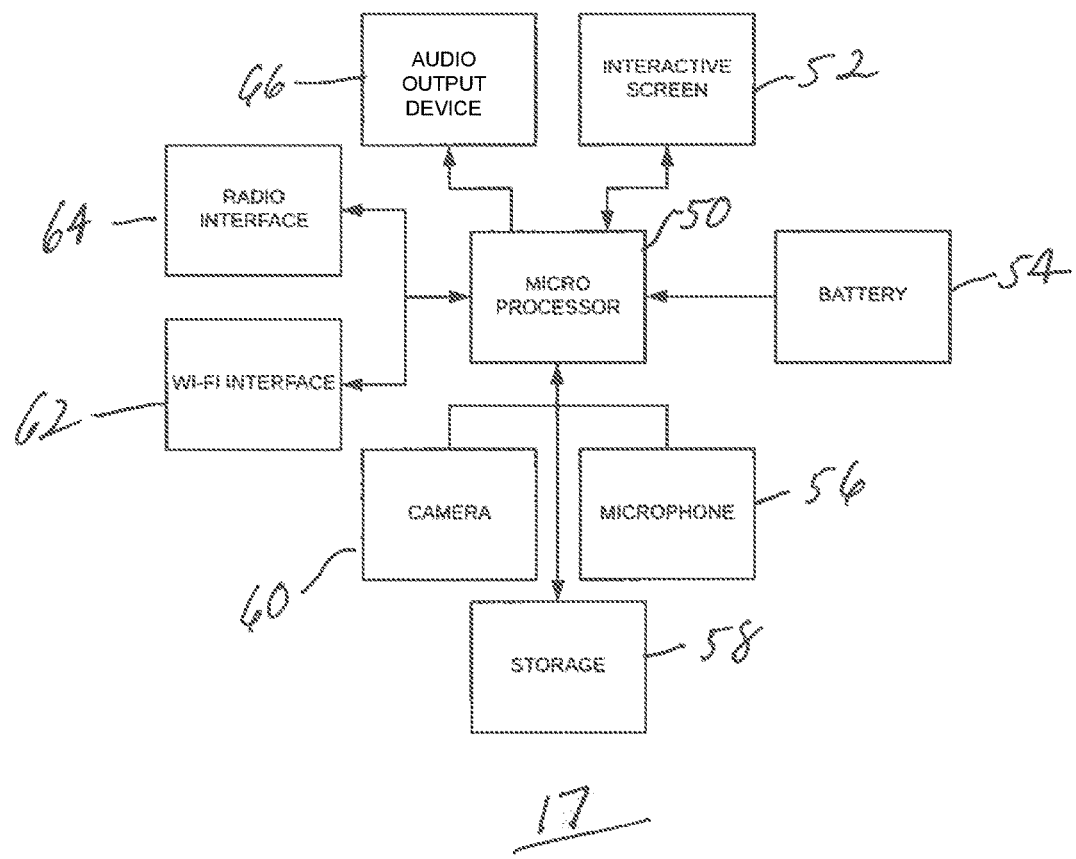
FIG. 2b is a block diagram of a wearable device.

Wearable Device Configuration:

FIG. 2*b* depicts a generic wearable device 17 configuration. Wearable devices 17 include at least a microprocessor 50, a microphone 56, a speaker 66, and a Wi-Fi interface 62 and as such may be used as a domestic device 12. Wearable devices 17 may also include a camera 60 to perform biometric identification, proximity detection, etc., a radio antenna 64 as an alternative method of communicating with the server, and an interactive screen 52 in order to update configuration information, activate a communication channel, or the like. Wearable devices 17 are typically powered by a battery 54 and include a storage device 58 to store configuration information. Wearable devices 17 may or may not include any number of other common computer processing components such as RAM, etc. Wearable devices 17 may take many forms, including but not limited to a watch, wrist band, anklet, AR/VR devices, headphones, hearing aids, etc., similar to smart devices on the market such as an Apple Watch, Microsoft HoloLens, FitBit, or the like.

Figure 2C:
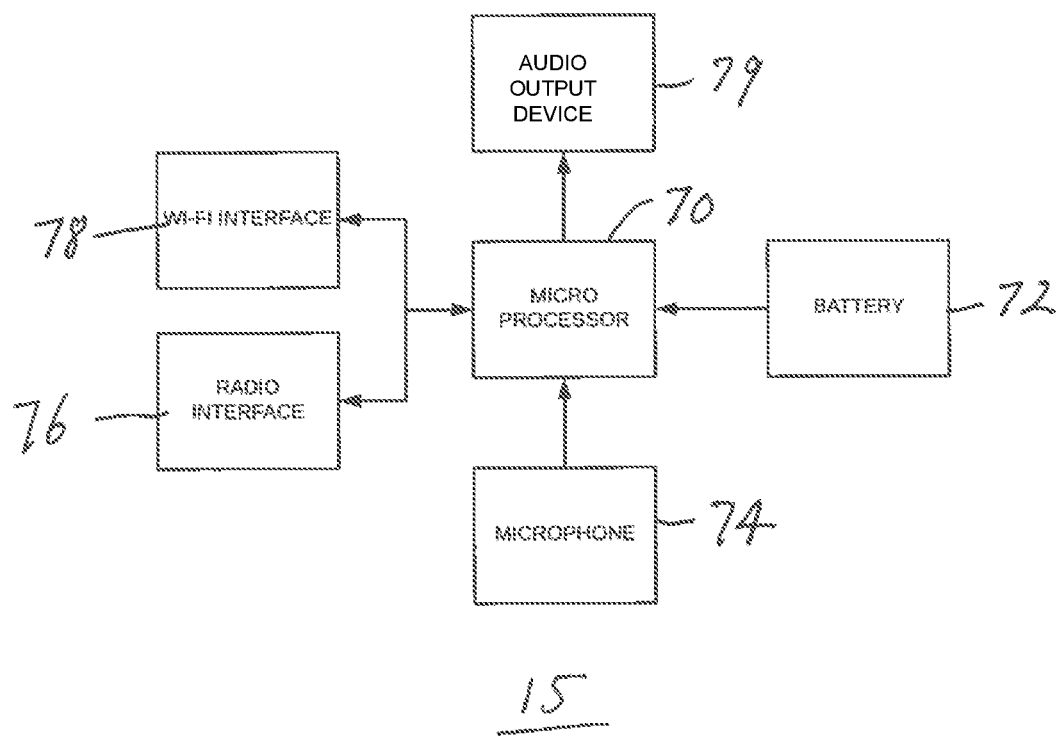
FIG. 2c is a block diagram of a hearing aid device.

Hearing Aid Device Configuration:

FIG. 2c depicts a typical digital in-the-ear hearing aid configuration, though the system will work with any type of hearing aid technology including analog, bone conductive, etc. Hearing aid devices 15 include at least one microprocessor 70, a form of audio input such as a microphone 74, and a form of audio output such as a speaker 79. Hearing aid devices 15 may also include common wireless computer processing components such as a battery 72, a Wi-Fi interface 78, a radio interface 76 as an alternative approach to communication, and a storage device included with microprocessor 70.

Figure 5B:
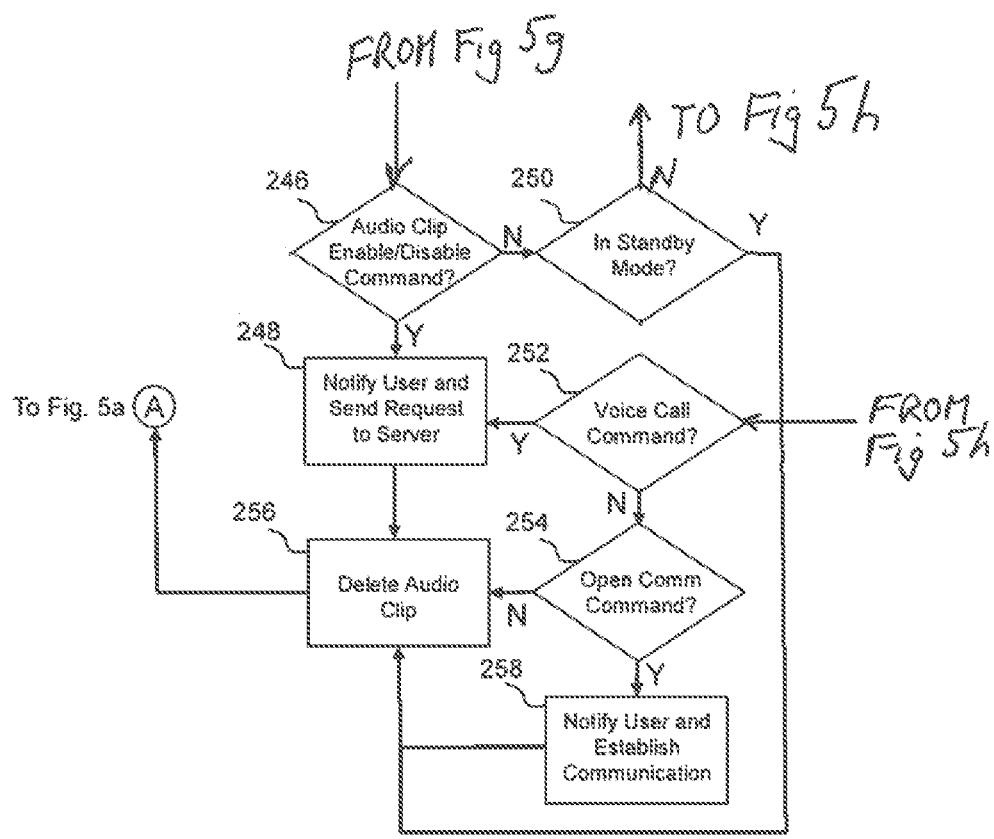
Figure 5C:
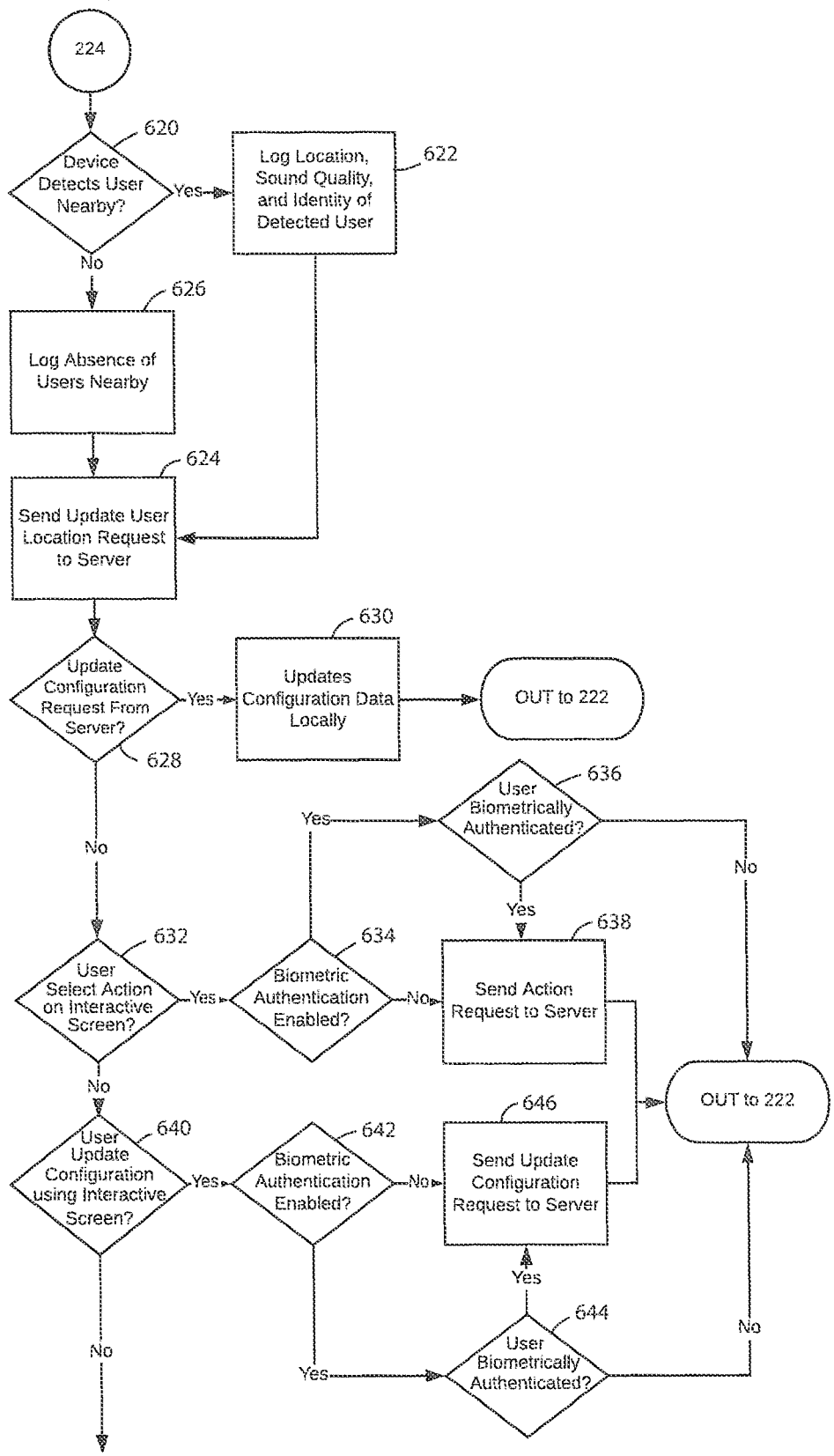
FIG. 5c is a continuation of the flowchart found in FIG. 5b.
Figure 5D:
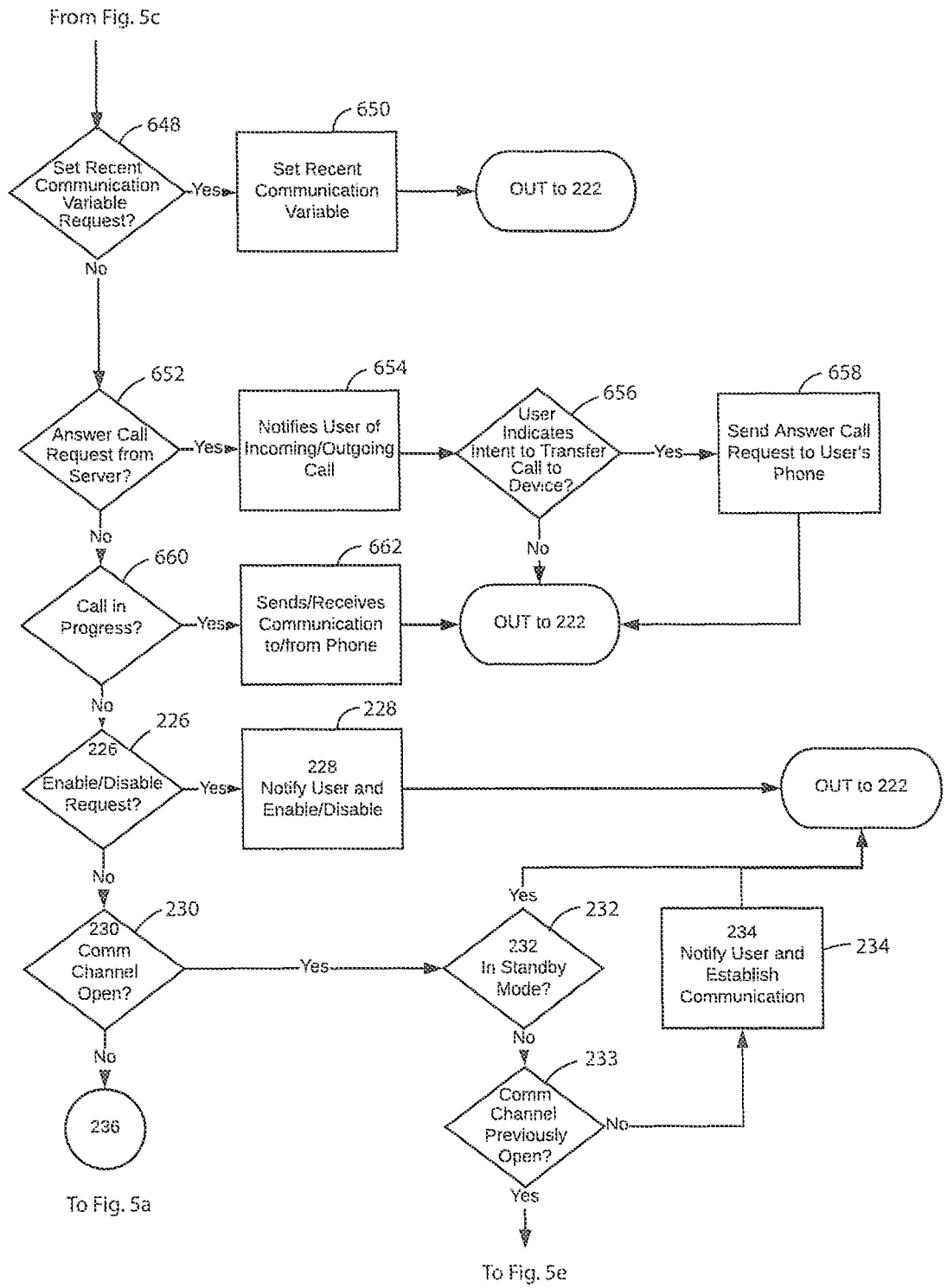
FIG. 5d is a continuation of the flowchart found in FIG. 5c.
Figure 5E:
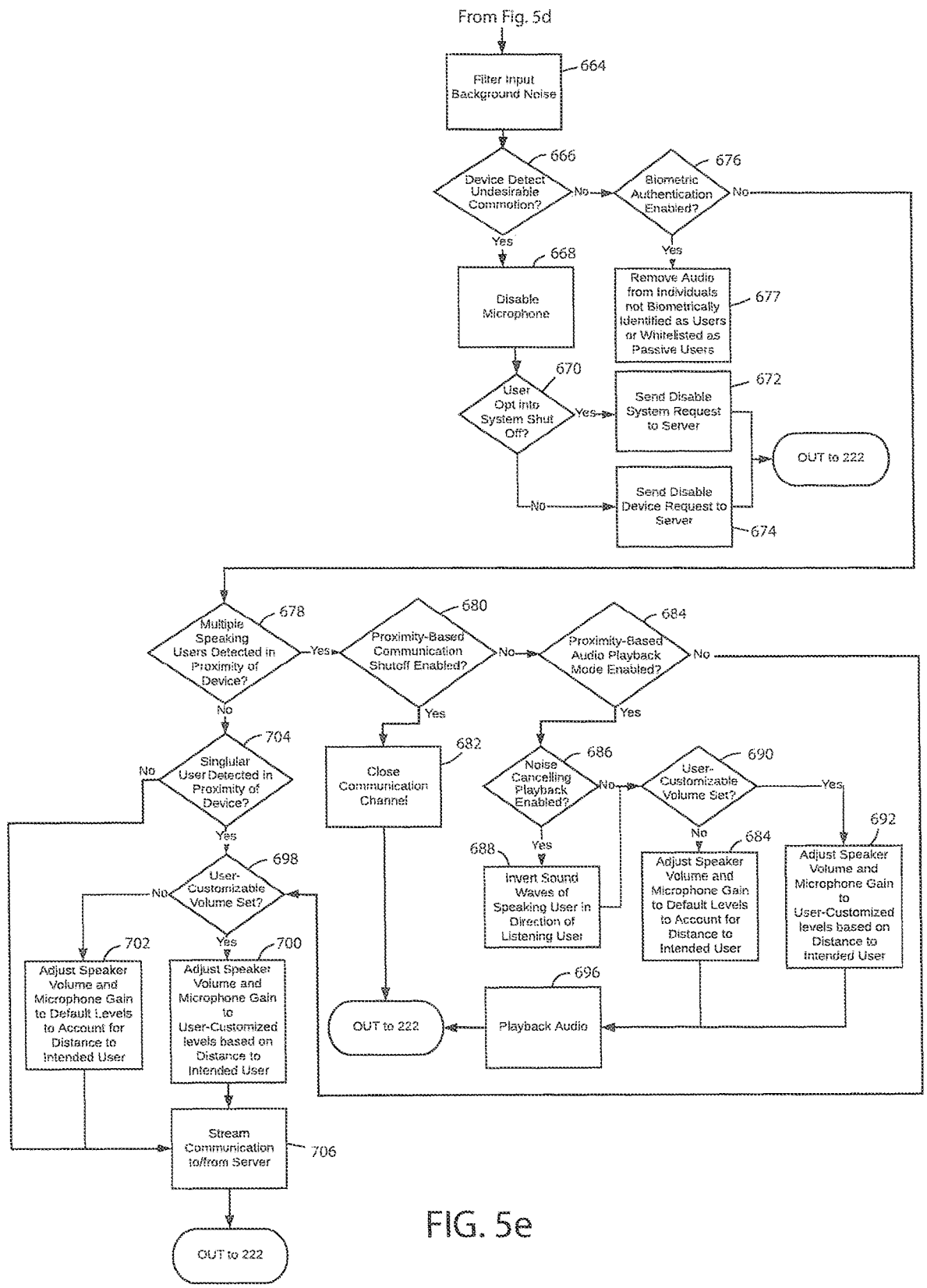
FIG. 5e is a continuation of the flowchart found in FIG. 5d.
Figure 5F:
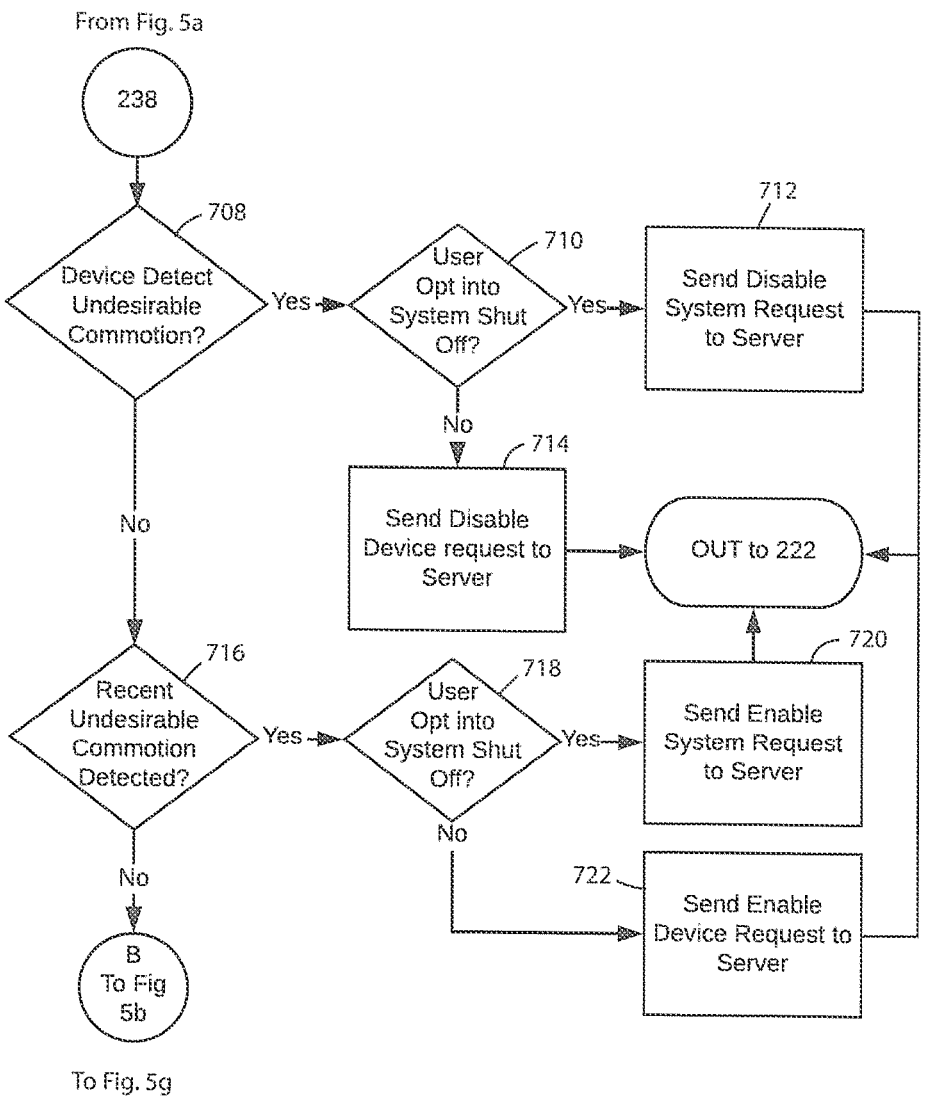
FIG. 5f is a continuation of the flowchart found in FIG. 5e.
Figure 5G:
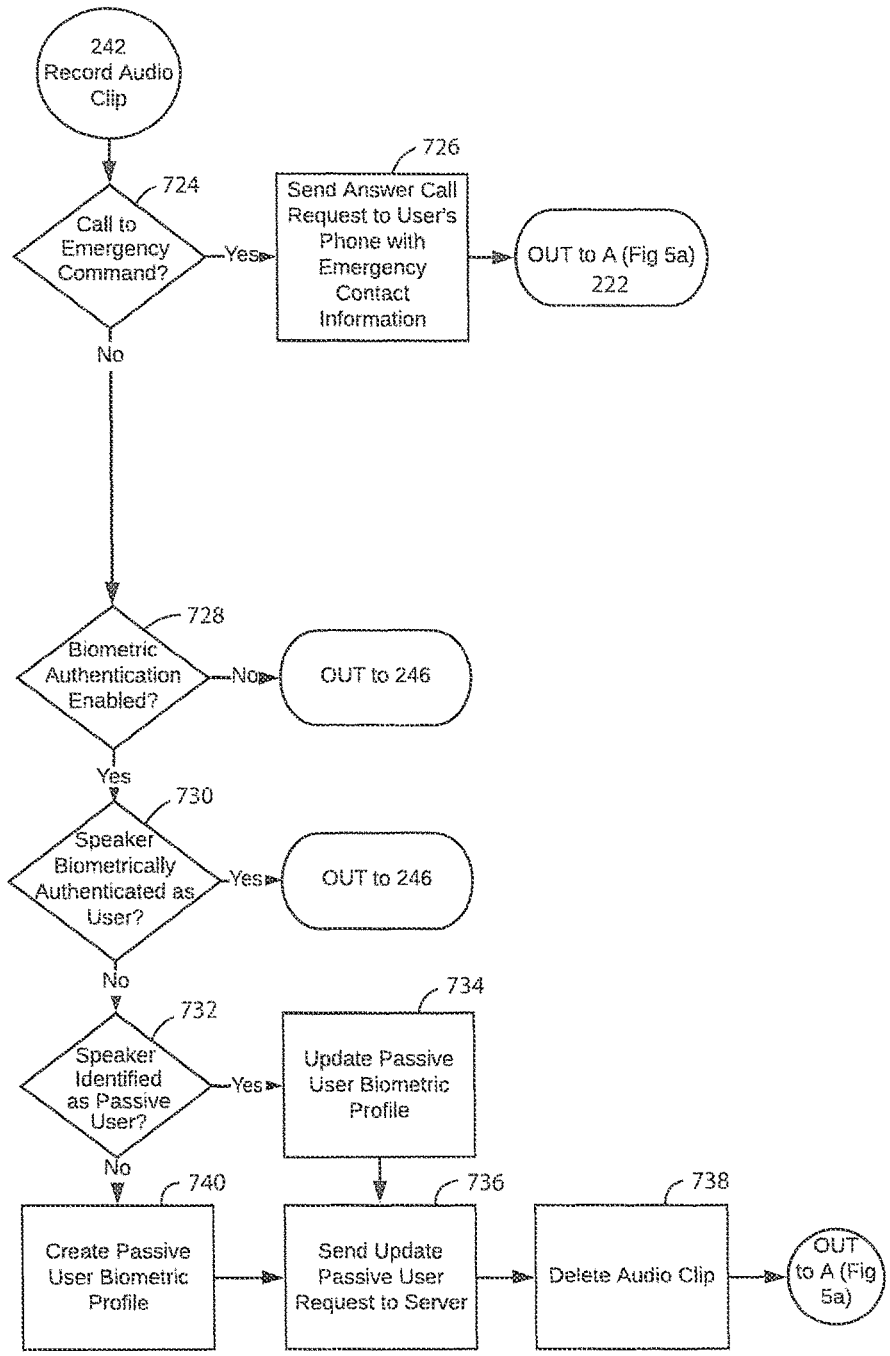
FIG. 5g is a continuation of the flowchart found in FIG. 5f.
Figure 5H:
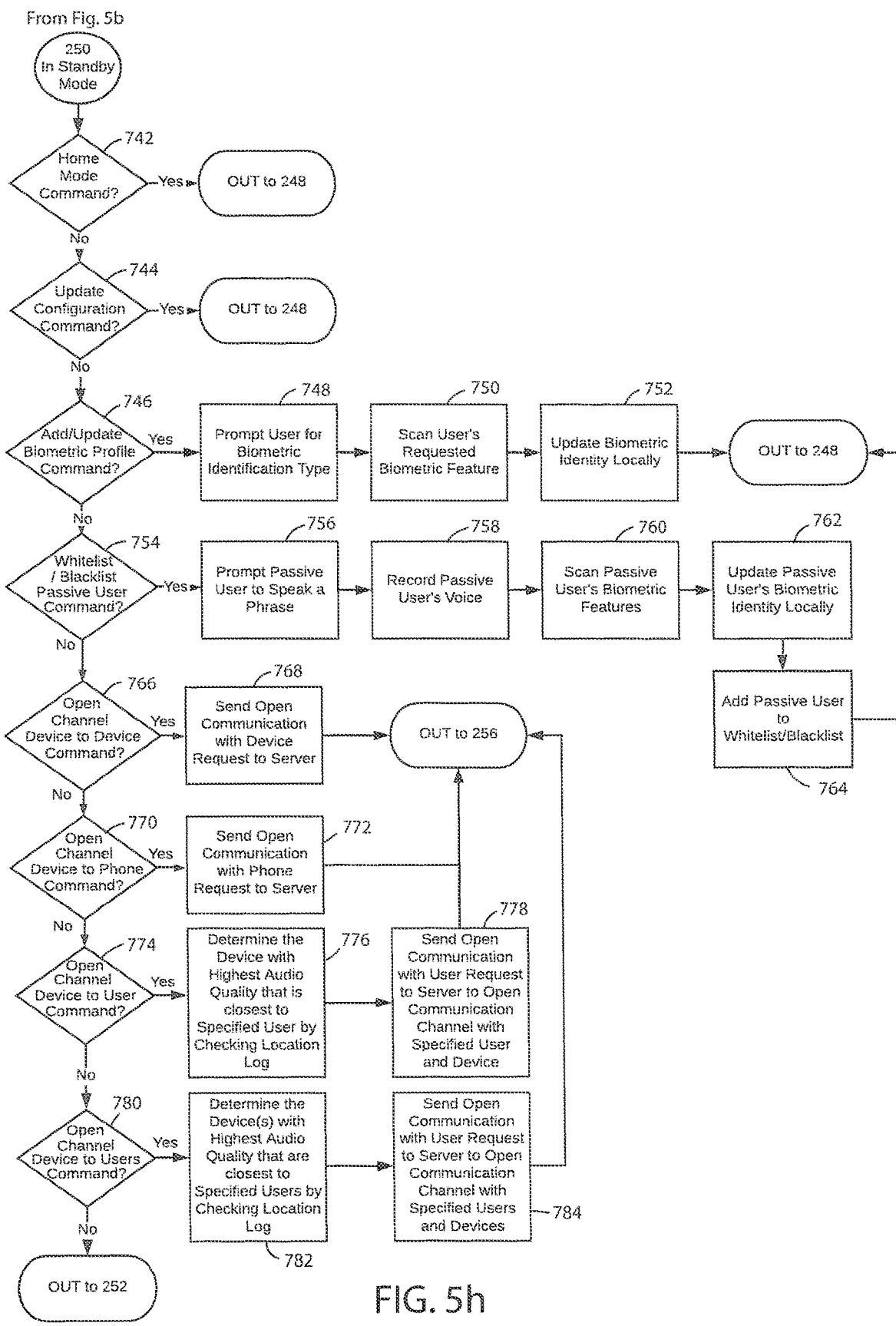
FIG. 5h is a continuation of the flowchart found in FIG. 5g.

FIG. 4 and FIG. 5a, through FIGS. 5h and 6 depict flowcharts for the device program executing on processor 30 of the domestic device 12, processor 50 of wearable device 17, or hearing processor 70 of hearing aid device 15, which will be collectively referred to as "the device" for the purpose of this discussion. The device powers on at 204 and begins executing the program at 206. The device program establishes multi-way communication between other devices at 208. This multi-way communication may, for example, be established through an application programming interface (API). Referring to FIG. 5a, the device program first determines if the device [12, 17, 15 ] is registered at 210 to a router 18 and/or server 14. If the device program is not registered, it proceeds to the registration phase at 212 (see FIG. 6). If the program of device [12, 17, 15] is registered, the device program next attempts connecting at 214 to server 14. The device program verifies connection with the server 14 at 216. If it does not have connection, the device program returns to attempting to connect at 214 to server 14. If the device program does have connection to the server 14, the device program next receives configuration data at 218 from the server 14. This configuration data comprises all the data the device [12, 17, 15] requires to begin functioning. This data may include vocal profiles, system status, and other relevant information. After receiving the configuration data, the device program enables the microphone input(s) and enables the speaker(s) at 220.

Proximity Sensors: Device

Next, the device program enters an idle state at 222. From the idle state, the device program again determines if it is connected at 224 to the server 14. If it is not, the device program returns attempting to connect at 214 to server 14. If the device program is connected to the server 14, the device [12, 17, 15] will use its sensors to detect if a user is nearby at 620. If so, it will log the identity, sound quality, and location of the detected user at 622 and send an Update User Location Request at 624 to the server 14. If the device [12, 17, 15] does not detect a user nearby at 620, it will log the absence of users nearby at 626 and send an Update User Location Request at 624 to the server 14 indicating that there are no users in its vicinity.

Configuration Information: Receive Device

After having logged the presence of users, or lack thereof at 620-624, the device will check if it received an update configuration request from the server 14 at 628. Updated configurations may include customizable user volume settings, variable distance volume levels, playback or microphone settings, server settings, and the like. If the device [12, 17, 15] received a configuration request at 628 from the server 14 it will update its configuration data locally at 630 and return to the device idle state at 222.

Interactive Screen:

If the device [12, 17, 15] did not receive an update configuration request at 628, the device [12, 17, 15] checks if a user selected an action on its interactive screen at 632 such as toggling Home Mode, adjusting volume, etc. If so, the device [12, 17, 15] will check if biometric authentication is enabled at 634. If biometric authentication is enabled, the device [12, 17, 15] will determine if the user is biometrically authenticated at 636. If so, the device [12, 17, 15] sends the request to the server 14 at 638 and then returns to the device's idle state at 222. If biometric authentication is not enabled, the device [12, 17, 15] will send the request to the server 14 at 638 and return to the device's idle state at 222. If the user did not select an action on its interactive screen, the device [12, 17, 15] will check if a user updated a configuration on the interactive screen at 640, such as a sound setting. If the user did attempt to update a configuration, the device will check if biometric authentication is enabled at 642. If so, the device [12, 17, 15] will scan the user's biometric features at 644 in an attempt to authenticate. If the user is authenticated the device [12, 17, 15] will send an update configuration request at 644 to the server 14 before returning to its idle state at 222. If biometric authentication is not enabled the device [12, 17, 15] will send an update configuration request at 646 to the server 14 before returning to the device's idle state at 222.

NLP Correction Variable:

If the user did not select to update a configuration using the interactive screen at 640, the device [12, 17, 15] will check if it received a Recent Communication Variable Request at 648. If so, the device [12, 17, 15] will set the "Recent Communication Variable" to true at 650 and return to its idle state at 222.

Call:

If the device [12, 17, 15] determines it did not receive a Recent Communication Variable Request from the server 14 at 648 the device will check if it received an Answer Call Request at 652 If so, the device [12, 17, 15] will notify the user of the incoming/outgoing call at 654. If the user indicates that they want to transfer the call to the device [12, 17, 15] at [656], the device will send an Answer Call Request to the user's phone at 658 and return to the idle state at 222. If the User either does not indicate they want to transfer the call to the device or does not answer the prompt at 656, the device will ignore the request and return to the idle state at 222. If an Answer Call Request was not received at 652 but the device determines that a call is currently in progress at 660 the device will send and receive communication to and from the phone at 662 and return to its idle state at 222.

If a call is not currently in progress, the device [12, 17, 15] next determines if it has received an enable or disable command at 226 from the server 14. The device [12, 17, 15] receives commands from the user by the user speaking an activation word or phrase followed by a command. Both the activation phrase and the commands may be defined by the user. For example, the activation word may by "system" and the command may be "enable." The user could then provide a system enable command by speaking "system enable" within range of a device [12, 17, 15]. Any reasonable number of activation words and commands can be created and stored by the server 14. Additionally, the activation words and commands may be in any language. If the device [12, 17, 15] program has received an enable or disable command, the device program provides an audio alert via the speaker [36, 66, 79 and appropriately enables or disables at 228. The device program then returns to the idle state at 222.

If device program has not received such a command, it next determines if a communication channel has been opened at 230 by the server 14. If it has, device [12, 17, 15] determines if it is a standby mode at 232. Standby mode is defined as a mode where the device [12, 17, 15] will only respond to an enable command. All other commands, such as ones to establish communication to other users, will be ignored. If the device is in a standby mode, the device disregards the open communication channel and returns to the idle state at 222. If the device is not in a standby mode, the device program will check if the communication channel was previously opened at [ ]. If the communication channel was not previously opened the device [12, 17, 15] provides an audio alert via the speaker [36, 66, 79], and sends and receives spoken communication to and from the server 14 via the microphone [34, 56, 74] and speaker [36, 66, 79] to establish communication at 234. The domestic device program then returns to the idle state at 222.

Audio Clarity/Commotion Channel Open:

If the communication channel was previously established at 233 the device [12, 17, 15] will filter background noise from the input audio stream at 664. The device [12, 17, 15] will then determine if the input audio stream contains undesirable commotion at 666. Undesirable commotion includes but is not limited to violent and sexual noises. The device [12, 17, 15] may use machine learning or other methods trained in these noises to make its determination. If the device [12, 17, 15] does detect undesirable commotion, it will temporarily disable the microphone at 668 and check if the user opted into shutting the system off under these circumstances at 670. If the user did opt into shutting the system off, the device [12, 17, 15] will send a disable system request at 672 to the server 14 before returning to its idle state at 222. If the user did not opt into shutting the system off under these circumstances the device will send a disable device request at 674 to the server 14 before returning to the idle state at 222.

Biometrically Identified User Communication:

If the device [12, 17, 15] does not detect undesirable commotion the device will check if biometric authentication is enabled at 676 If so, the device [12, 17, 15] will remove audio at 677 from the input stream from individuals who are not biometrically identified as users or as whitelisted Passive Users. This prevents those who are not identified by users as someone able to use the system from communicating over the system and/or stating a command.

Proximity Communication:

After having determined that biometric authentication is not enabled or having already removed non-users voices from the audio stream, the device [12, 17, 15] will check if there are more than one user detected in the proximity of the device at 678. If so, the device [12, 17, 15] will determine if the proximity-based communication shutoff setting is enabled at 680. If so, the device will close the communication channel at 682 in order to allow the users to communicate face to face without the aid of the device. If the user did not enable proximity-based communication shutoff, the device [12, 17, 15] will check if proximity-based audio playback mode is enabled at 684. If so, the device will check if noise cancelling playback is enabled at 686. If so, the device will invert the sound waves of the speaking users in the direction of the listening user at 688 so as to mute the speaking user from the perspective of the listening user.

Regardless of the decision of noise cancelling playback being enabled, the device [12, 17, 15] will determine if the user(s) in its proximity has a customizable volume set at 690. If so, the device [12, 17, 15] will adjust the speaker [36, 66, 79] volume and microphone [34, 56, 74] gain to the user's customized audio levels based on the distance to the user at 692 so as to provide an optimal volume for the intended user(s). If the user(s) did not set a customizable volume, the device will adjust the speaker [36, 66, 79 ] volume and microphone [34, 56, 74] gain to default output levels to account for the distance to the intended user(s) at 694. The device [12, 17, 15] will then playback the input audio at 696 before returning to the idle state at 222.

If proximity-based audio playback is not enabled at 684 then the device [12, 17, 15] will determine if a user-customizable volume is set for the nearby user(s) at 698. If so, the device [12, 17, 15] will adjust its speaker [36, 66, 79] and microphone [34, 56, 74] levels to account for that user's preferences at 700; whereas if the user(s) don't have customizable levels set it will adjust the speaker [36, 66, 79] and microphone [34, 56, 74] levels to the default state at 702]. If there are not multiple users detected in the proximity of the device [12, 17, 15], the device will determine if a single user is detected in proximity of the device at 704. If so, the device will check if the intended user set a customizable volume at 698. If so, the device will adjust its speaker [36, 66, 79] volume and the microphone [34, 56, 74] gain to the user-customized levels at 700 based on the user's distance to provide the best quality audio. If the user did not set a customizable volume, the device will set its speaker volume and the microphone gain to its default levels at 702 which are based on the distance to the intended user. In either case, the device [12, 17, 15] will continue to stream the filtered input and output audio over the communication channel to the server 14 at 706 before returning to its idle state at 222.

If the device program determines a communication channel has not been opened at 230, it next determines if the microphone is detecting sound at 236. If it is not, the device program returns to the idle state at 222. Detecting sound includes determining if the detected sound is above a variable threshold. This variable threshold is provided in order adapt to the specific location and ambient sound level of each domestic device 12 and to specific user needs and desires. If it does detect sound, then the domestic device program next determines if the sound is above a variable cutoff threshold at 238. The variable cutoff threshold is provided in order to ensure that certain spoken communication is not analyzed or recorded. If the sound is above the variable cutoff threshold, the domestic device program requests that the server 14 disable the system at 240 before returning to the idle state at 222.

Commotion, Channel Closed:

If the detected sound is below the variable cutoff threshold the device [12, 17, 15] will determine if the input audio contains undesirable commotion at 708 such as violent or sexual behavior. If the device detects undesirable commotion in the input audio the device will check if the user opted in to shut the entire system off in this circumstance at 710. If the user previously opted in to shutting the system off, the device [12, 17, 15] will send a disable system request to the server 14 at 712 before returning to its idle state at 222. If the user did not opt in to a system shut off after detecting undesirable commotion, the device [12, 17, 15] will send a disable device request at 714 to the server 14 returning to the idle state at 222. If the device does not detect undesirable commotion at 708, the device will check if recent undesirable commotion was detected at 716. If recent undesirable commotion was detected but the device does not currently detect undesirable commotion, the device will check if the user opted into a system shut off under the circumstances of detecting undesirable commotion at 718. If a user opted into a system shut off under these circumstances, the device [12, 17, 15] will send an enable system request to the server 14 at 720 before returning to the idle state at 222. If the user did not opt into a system shut off upon detecting undesirable commotion at 718, the device [12, 17, 15] will send an enable device request to the server 14 at 722 before returning to the idle state at 222.

Emergency Call:

If the device [12, 17, 15] no longer detects undesirable commotion at 708 and there was no recent undesirable commotion detected at 716, the device program records the audio clip at 242. Before applying biometric tests, the device [12, 17, 15] determines if the recording has a Call Emergency Command at 724. If so, the device will send an Answer Call Request to the primary User's Phone 726 with the local Emergency Contact Information attached and then return to the idle state at 222.

Biometric Authentication:

After having determined that there is no Call to Emergency Command, the device [12, 17, 15] will check if biometric authentication is enabled at 728. If so, the device will check if the speaker is biometrically authenticated as a User at 730. If the speaker is not biometrically authenticated as a User, the device [12, 17, 15] will determine if the speaker is identified as a Passive User at 732. If so, the device will update the Passive User's Biometric Profile at 734, send an Update Passive User Request to the server 14 at 736, delete the audio clip at 738 and return to the idle state at 222. If at 730 the speaker is not identified as a User or at 732 a Passive User, the device [12, 17, 15] will create a Passive User Biometric Profile at 740, send an Update Passive User Request to the server 14 at 736, delete the audio clip at 738, and return to the idle state at 222. This feature allows the system 10 to restrict the use of the system 10 to specific individuals while also keeping track of users who attempt to use the system for later identification and processing.

If biometric authentication is not enabled or if the speaker is identified as a biometrically authenticated user, the device program next determines if the audio clip is an enable or disable command at 246. This command can be directed toward a specific device or the system 10 as a whole. If the audio clip is an enable or disable command, the device program provides an audio alert via the speaker [36, 66, 79], and sends the appropriate enable or disable request at 248 to the server 14. The device program then deletes the audio clip at 256 and returns to the idle state at 222. If the device program determines that the audio clip is not an enable or disable command, it next determines if the device [12, 17, 15] is in standby mode at 250. The device is placed into standby mode after it received a disable request from the user or the server 14. If the device [12, 17, 15] is in standby mode, the device program deletes the audio clip at 256 and returns to the idle state at 222.

Home Mode:

If the device [12, 17, 15] is not in standby mode, the device will determine if the audio clip is a home mode command at 742. Home Mode removes the timeout from an open channel enabling seamless communication over the system 10 without the need to open a communication channel via a voice command. If so, the device will notify the user and send the request to the server at 248, delete the audio clip at 256, and then return to the idle state at 222. If the audio clip was not a home mode command, the device [12, 17, 15] will check if it received an update configuration command at 744. An update configuration command could be to set the output volume, modify system shutoff settings, or the like. If the audio clip does contain an update configuration command the device [12, 17, 15] will notify the user and send the request to the server at 248, delete the audio clip at 256, and then return to the idle state at 222.

Biometric Registration:

If at 744 the audio clip does not contain an update configuration command the device [12, 17, 15] will check if the command was an Add/Update Biometric Profile command at 746. If so, the device will prompt the user for the biometric identification type 748. Types of biometric features include face, iris, gait, voice, hand gestures, eye movements, body gestures, and the like. Once the user selects the identification type, the device will scan the user's requested biometric feature at 750, update the user's biometric identity locally at 752, notify the user and send the request to the server 14 at 248, and then delete the audio clip at 256 before returning to the idle state at 222. If at 746 the user did not use an add/update biometric profile command, the device will determine if the user used a Whitelist/Blacklist Passive User Command at 754. The passive user whitelist is used to give a level of permissions to specific users, such as close friends or relatives, in order to allow them to access parts of the system. The passive user blacklist bans users from using the system. If the user used a whitelist/blacklist passive user command, the device [12, 17, 15] will prompt the Passive User to speak a phrase at 756, record the passive user's voice at 758 assigning it to their biometric identity, scan the passive user's other biometric features such as face, gait, iris, etc. at 760, update the passive user's biometric identity locally at 762, add the passive user to the respective whitelist/blacklist at 764, notify the user of its completion and send the request to the server 14 at 248, delete the audio clip command at 256 and finally return to the idle state at 222.

Open Communication Devices/User:

If the device [12, 17, 15] determines at 754 that the audio clip did not contain a Whitelist/Blacklist Passive User Command, the device will check if it received an Open Channel Device to Device Command at 766. This command enables direct device [12, 17, 15]-to-device [12, 17, 15] communication. If so, the device will send Open Communication with Device Request to the server 14 at 768. The device [12, 17, 15] will notify the user and send the request to the server at 248, delete the audio clip at 256, and then return to the idle state at 222. If at 766 the audio clip did not contain an open channel device to device command, the device [12, 17, 15] will check if the audio clip contained an Open Channel Device to Phone Command at 770. This command enables direct device [12, 17, 15] to phone communication. If so, the device [12, 17, 15] will send an Open Communication with Phone Request to the server at 772. The device [12, 17, 15] will notify the user and send the request to the server at 248, delete the audio clip at 256, and then return to the idle state at 222. If rather the device determines the audio clip contained an Open Channel Device to User Command at 774.

The Open Channel Device to User command enables a user using a device to open a channel to a device which is closest to a specified user based on the location log. As the specified user may change their location, the system 10 is adapted to modify the devices [12, 17, 15] that are connected to the communication channel based on the specified user location. If so, the device [12, 17, 15] will determine the device with the highest audio quality that is closest to the specified user by checking its Location Log at 776, then send an Open Communication with User Request to the Server at 778. The device [12, 17, 15] will then notify the user and send the request to the server at 248, delete the audio clip at 256, and then return to the idle state at 222. If the audio clip did not contain an Open Channel Device to User Command, the device will check if the audio clip contained an Open Channel Device to Users Command at 780. This allows for the opening of a channel between a set of devices [12, 17, 15] which are closest to a set of specified users. The set of devices closest to the set of specified users may change, and the system 10 will adapt to ensure the closest devices [12, 17, 15] to the specified user, and thus the highest quality audio, is used. If so, the device [12, 17, 15] will determine the devices with the highest audio quality that are closest to the specified users by checking the Location Log at 782 and send an Open Communication with User Request to the server 14 with the specified users attached at 784. The device [12, 17, 15] will then notify the user and send the request to the server at 248, delete the audio clip at 256, and then return to the idle state at 222.

If the audio clip did not contain an open channel device to users command, the device [12, 17, 15] will determine if the audio clip is a voice call command at 252. If it is, the device program provides an audio alert via the speaker [36, 66, 79] and sends the call request to the server 14 at 248. The device program then deletes the recorded audio clip at 256 and returns to the idle state at 222.

NLP Correction: Reopen

If the audio clip is not a voice call command, the device program next determines if the audio clip is an open communication channel command at 254. If the audio clip does not contain an open communication channel command, the device [12, 17, 15] will delete the audio clip at 256 and return to the idle state at 222. If the Recent Connection variable is set to true it will use Natural Language Processing, or a similar machine learning algorithm, to determine if a user who was recently in a conversation over a communication channel is attempting to reinitiate their conversation with another user who was on the previous communication channel. If the device [12, 17, 15] determines that the users are trying to reinitiate their conversation the device [12, 17, 15] will open a communication channel with the server 14 at 258 and reset the recent communication variable to false. If the users don't attempt to reinitiate their conversation, the device will determine if a variable amount of time has passed at. If a variable amount of time passes after the recent connection variable is set, the recent communication variable will reset to false and the audio clip will be deleted at 256 before the device returns to its idle state at 222. If a variable amount of time does not pass the device will delete the audio clip at 256 and return to the idle state at 222.

Callout Playback:

If the audio clip is an open communication channel command, the device program provides an audio alert via the speaker [36, 66, 79] and establishes an open communication channel with the server 14 at 258. The device [12, 17, 15] will then play the audio clip over the communication channel so as to initiate the conversation as intended at. At the conclusion of the communication, the device program then deletes the recorded audio clip at 256 and returns to the idle state at 222.

Figure 6:
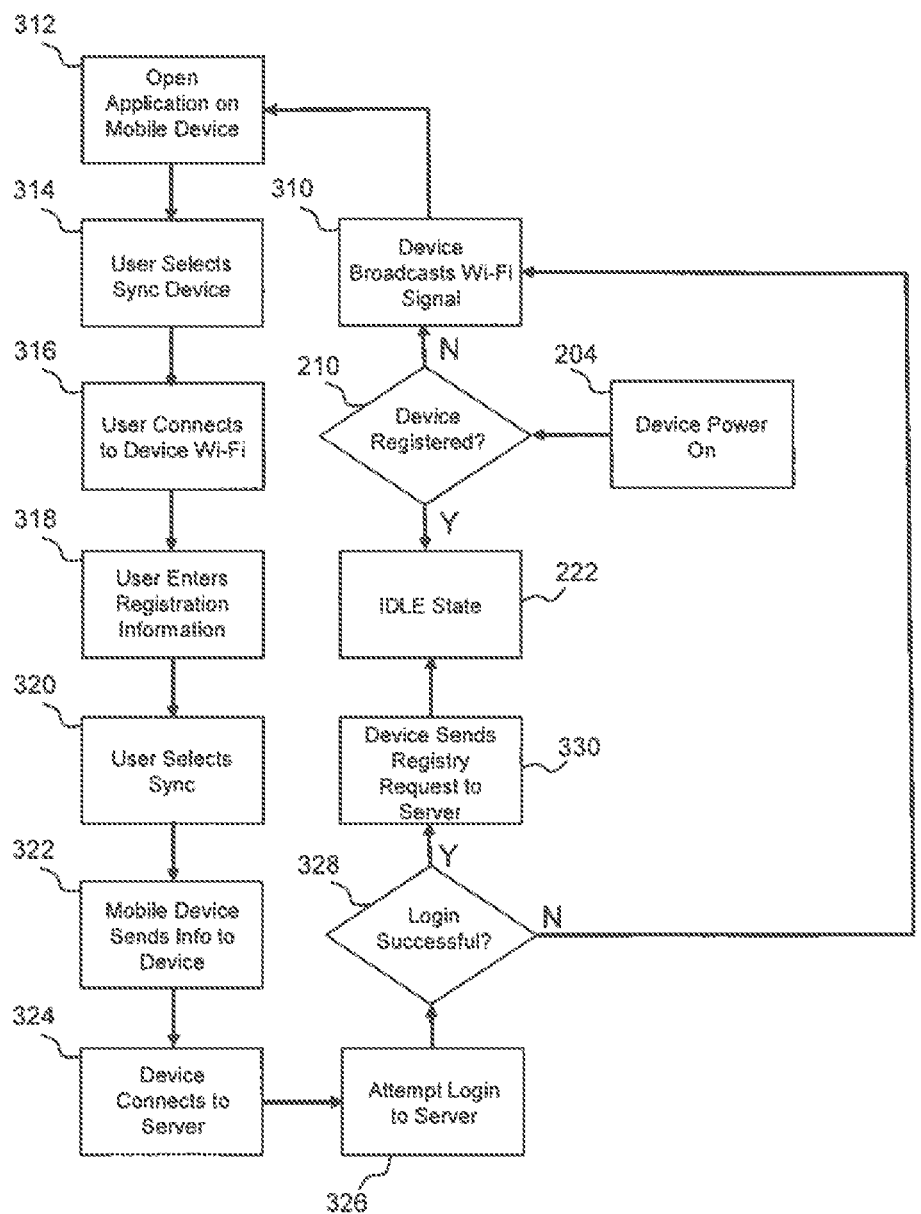
FIG. 6 is a flowchart of a device registration program.

As mentioned previously, the server 14 may restrict communications to only registered devices. Turning now to FIG. 6, after one of the devices, such as a domestic device 12, wearable device 17, or hearing aid device 15 powers on at 204, when the device program determines that the device is not registered at 210, the device program broadcasts a Wi-Fi signal at 310. Next, a user opens a registration application at 312 on a device, such as a phone or a tablet. This device may or may not be a mobile device 22 in digital communication with the server 14. The user then selects a sync device option at 314 offered by the registration application. The user then connects the mobile device to the Wi-Fi broadcast by the device [12, 17, 15] at 316, establishing direct digital communication between the mobile device and the device [12, 17, 15]. Next, the user enters registration information into the registration application at 318. Registration information can include information such as usernames, passwords, account information, router information, or anything else relevant to authenticating the user and/or device [12, 17, 15]. After entering the information, the user selects to sync the device [12, 17, 15] at 320. This allows the device to transmit the registration information at 322 to the device [12, 17, 15].

Then, the device [12, 17, 15] ceases broadcasting its Wi-Fi signal, and instead attempts to connect at 324 to the server 14. This connection may be achieved through a router 18 or any other device that provides digital communication with the server 14. This connection process may require any sort of authentication or credentials inherent in such a connection. For example, the device may need to provide a password to access the wireless network broadcast by a router 18. Either immediately before or immediately after the connection is established, the device program transmits the registration information to the server 14, in order to login at 326. The device program then determines if the login was successful at 328. If the login was not successful, the device program returns to broadcasting a Wi-Fi signal at 310. If the login was successful, the device program sends a registry request at 330 to the server 14, so that the server 14 may store the device's [12, 17, 15] registration information to facilitate future connections. Next, the device program enters the idle state at 222.

Figure 7A:
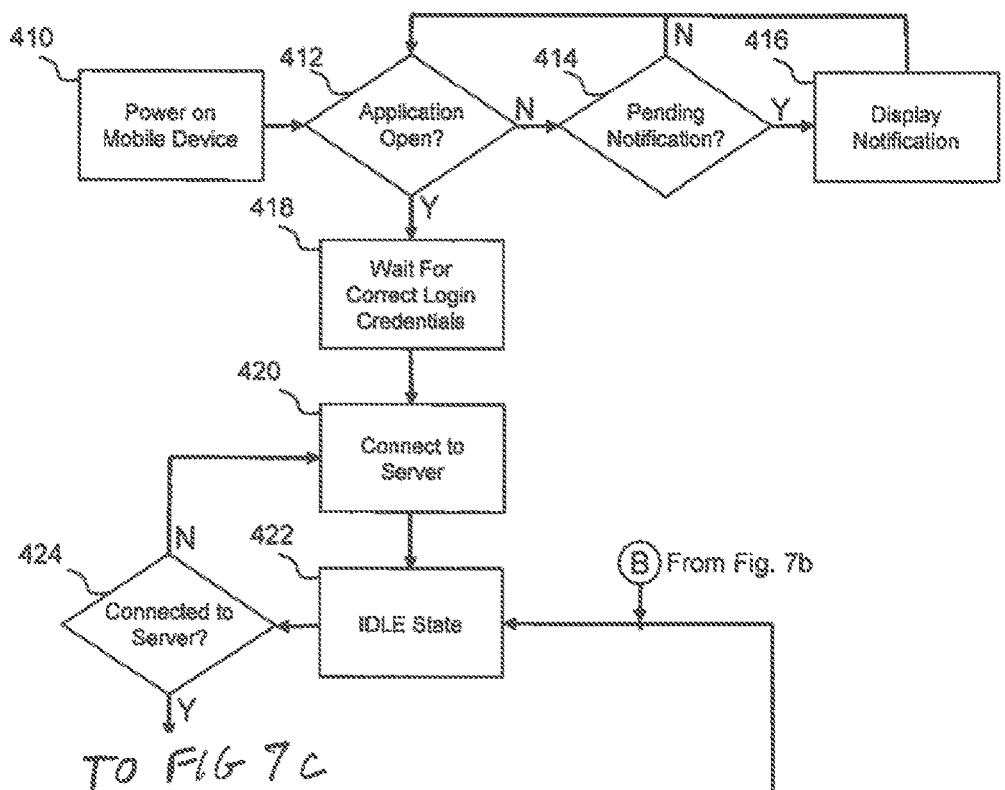
FIG. 7a is a flowchart of a mobile device program.
Figure 7A:
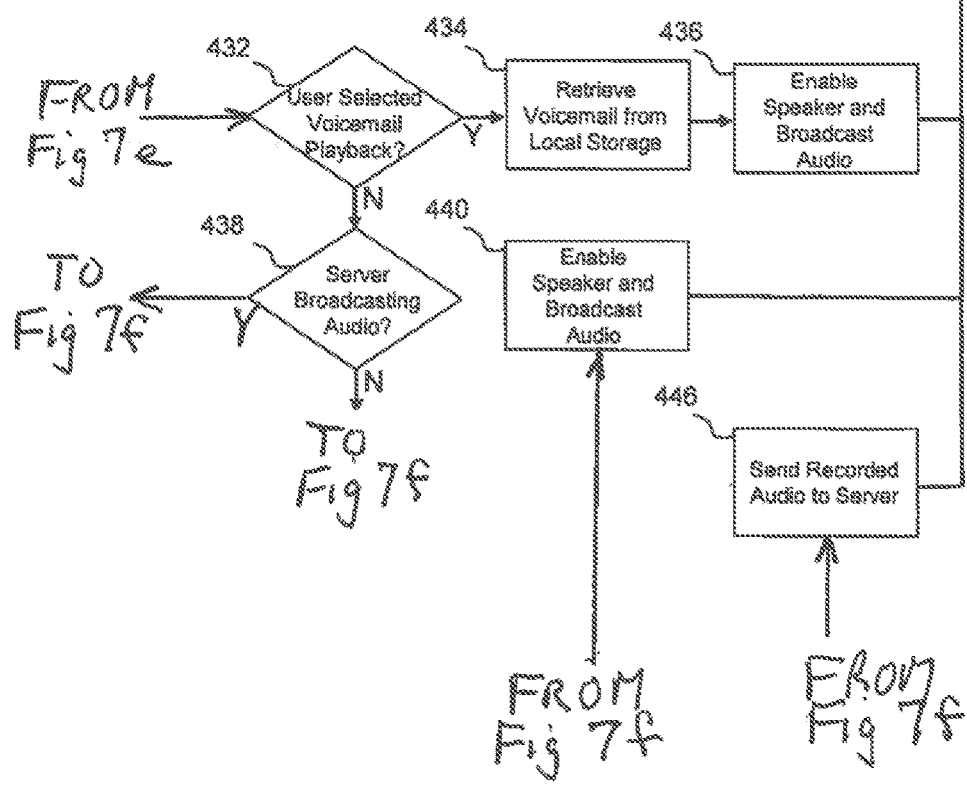
Figure 7C:
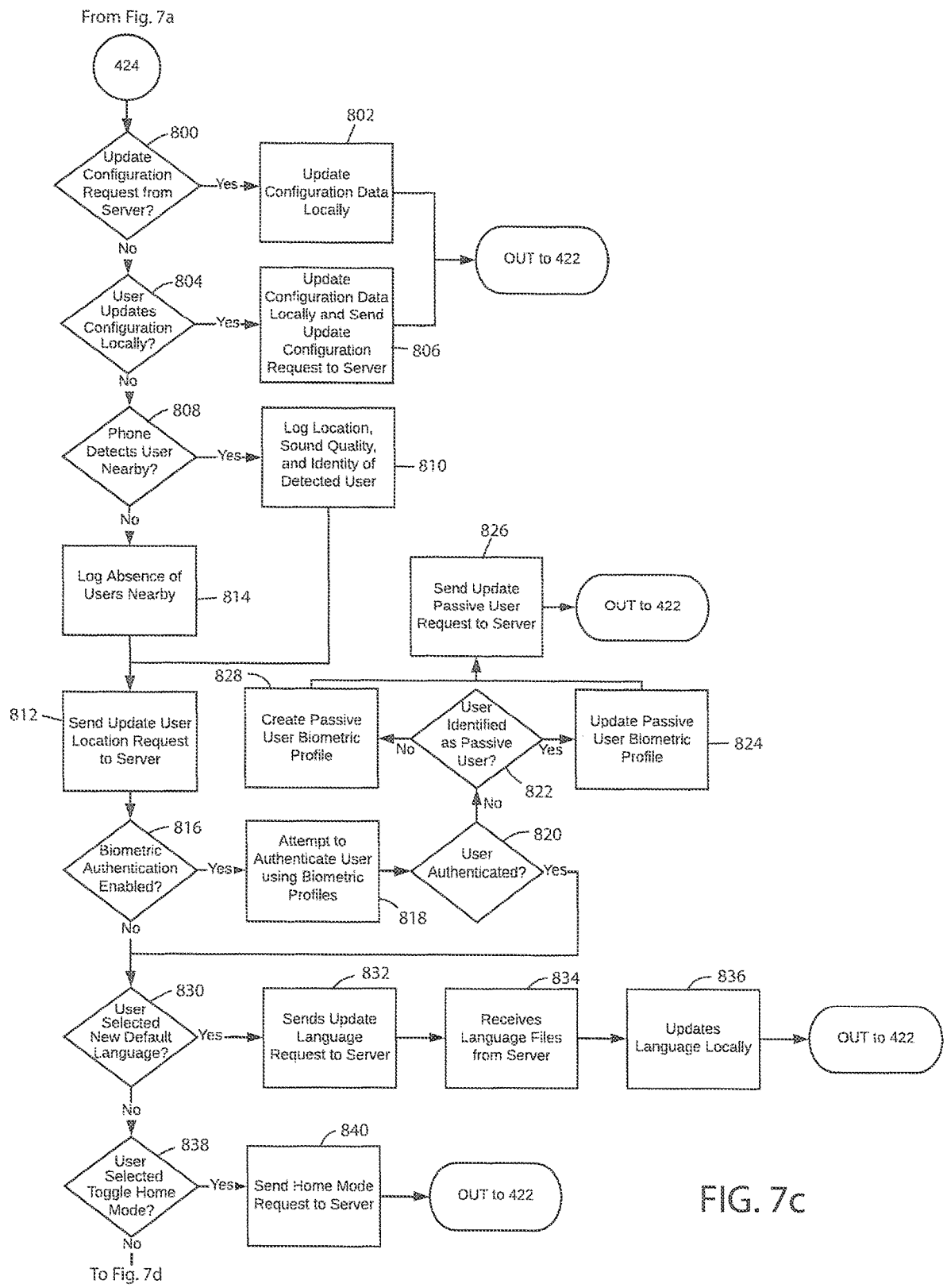
FIG. 7c is a continuation of the flowchart found in FIG. 7b.
Figure 7D:
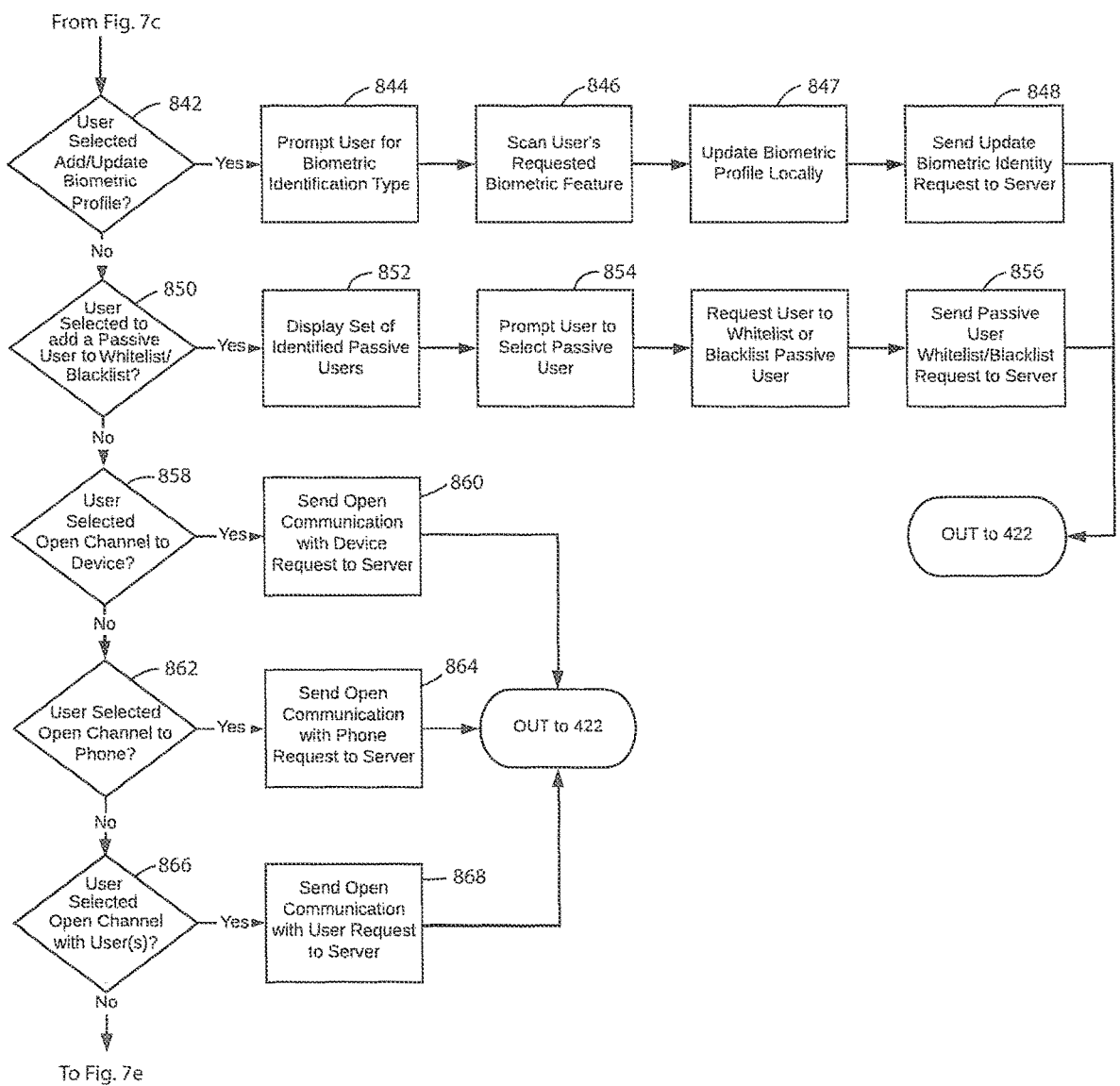
FIG. 7d is a continuation of the flowchart found in FIG. 7c.
Figure 7E:
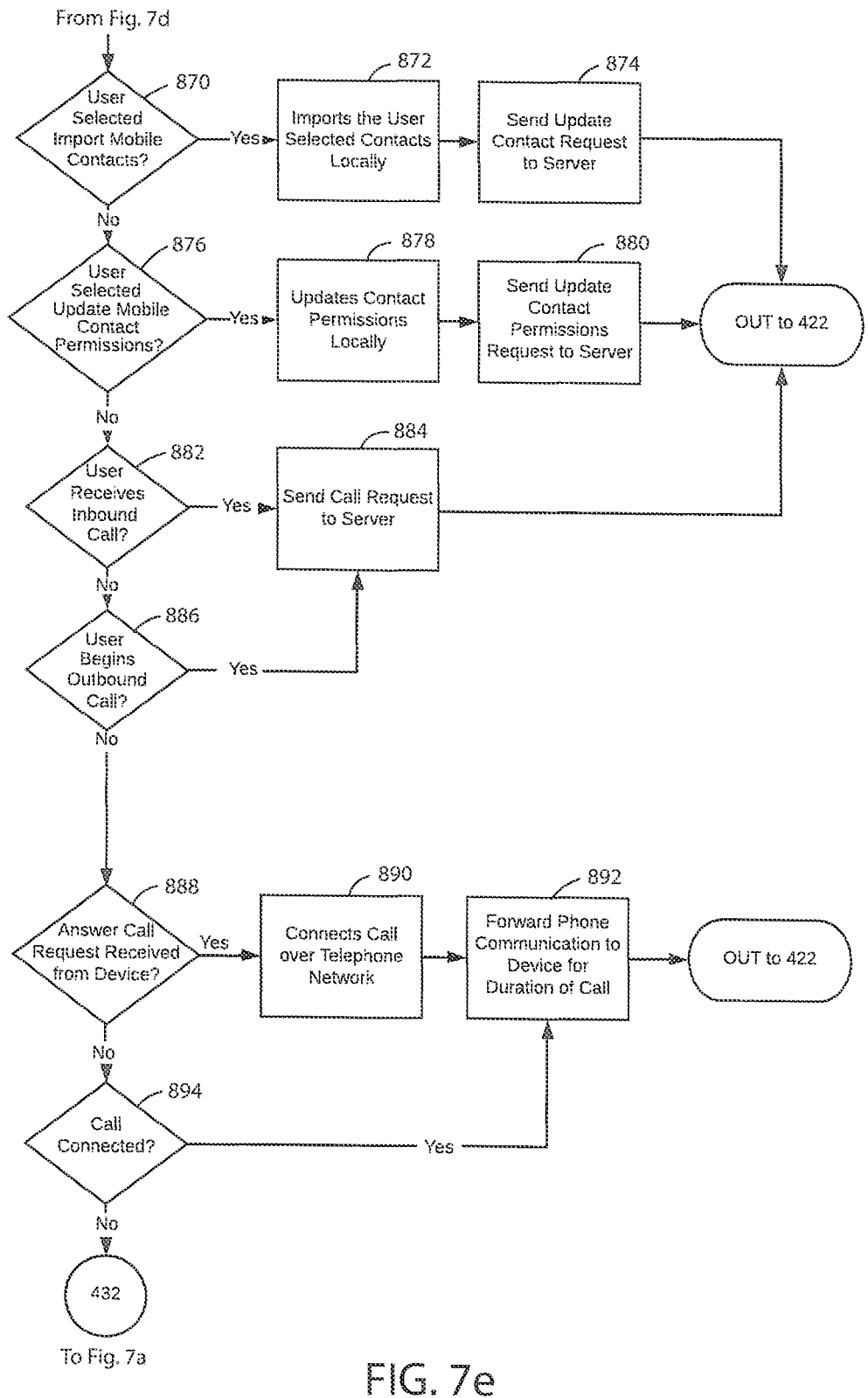
FIG. 7e is a continuation of the flowchart found in FIG. 7d.
Figure 7F:
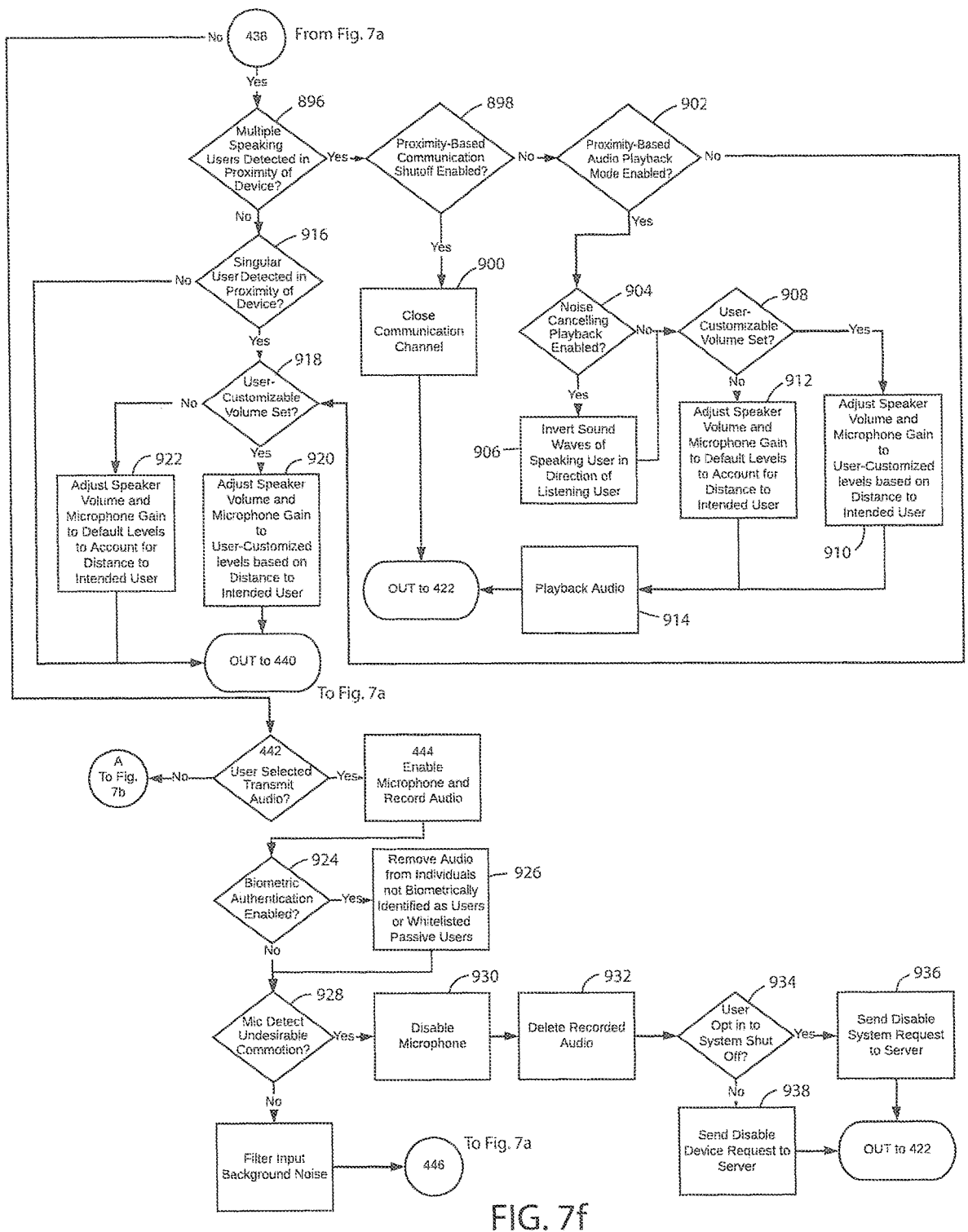
FIG. 7f is a continuation of the flowchart found in FIG. 7e.

A mobile communication application is run on a smart phone, tablet, or other mobile device 22 that is connected to the Internet through a Wi-Fi or cellular data service, such as 3G, 4G, 5G, LTE, or the like. As shown in FIG. 7a, after a mobile device 22 powers on at 410, the mobile communication application determines if the user has opened the application at 412. If the user has not opened the application, the mobile communication application determines if there is a pending notification at 414. Such a notification indicates that the user has a voicemail or other message awaiting playback. If there is such a notification, the mobile communication application displays the notification to the user. If there is no notification, the mobile communication application returns to determining if the application is open at 412. If it determined that the mobile communication application is open, it then waits of the user to enter proper login credentials at 418. Login credentials typically include a username and password, but other authentication may be used, such as biometric authentication. After entering the proper login credentials, the mobile communication application attempts to connect at 420 to the server 14. The mobile communication application will continue to attempt until a connection is established. The mobile communication application then enters an idle state at 422. The mobile communication application then determines if it is still connected at 424 to the server 14. If not, the mobile communication application returns to attempting to connect at 420 to the server 14.

Configuration Information: Send/Receive

If the mobile phone 22 remains connected to the server 14 at 424, the mobile communication application will determine if it received an update configuration request from the server 14 at 800. If so, the mobile communication application will update its configuration data locally at 802 before going back to the idle state at 422. If the mobile communication application didn't receive an update configuration request from the server 14, it will determine if the user updated the system configuration locally at 804. If so, the mobile communication application will save the updated configuration data and send an update configuration request to the server 14 at 806 before returning to the idle state at 422.

Proximity Sensors:

If the user did not select to update the system configuration locally the mobile communication application will check if it detects a user nearby by using its various proximity sensors at 808, such as its camera(s), microphone, etc. If so, it will log the location, sound quality, and identity of the detected user at 810 and send an Update User Location Request to the server 14 at 812. If the mobile communication application didn't detect a nearby user at 808, it will log the absence of users nearby at 814 and send an Update User Location Request to the server 14 indicating that there are no users in its vicinity at 812.

Biometric Authentication:

In either case, the mobile communication application will check to see if biometric authentication is enabled at 816. If so, the mobile communication application will attempt to authenticate the user using the registered biometric profiles at 818. If the user is not authenticated at 820, the mobile communication application will determine if the phone's user is identified as a passive user at 822. If so, the mobile communication application will update the passive user's biometric profile at 824, send an Update Passive User Request to the server 14 at 826 and return to the idle state at 422. If the mobile phone's 22 user is not identified as a passive user or authenticated as a user at 822, the mobile communication application will create a passive user biometric profile at 828 and send an Update Passive User Request to the server 14 at 826 before returning to the idle state 422.

Native Language:

If the user is authenticated at 820 or if biometric authentication is not enabled at 816 the mobile communication application will determine if the user selected a new default language at 830. If so, the mobile device 22 will send an update language request to the server 14 at 832. The server 14 will send the updated language files to all of the connected devices including the sending mobile device 22 at 834. The mobile communication application will then update its language settings locally at 836.

Home Mode:

If the user did not select a new default language the mobile communication application will determine if the user toggled Home Mode at 838. If so, the mobile communication application will send a Home Mode Request to the server at 840 before going back to the idle state at 422.

Biometric Registration:

If the user did not toggle home mode at 838 the mobile communication application will check if the User selected add/update biometric profile at 842. If so, the mobile communication application will prompt the user for the type of biometric identification they wish to register at 844. Types of biometric features include iris, gait, voice, hand gestures, eye movements, body gestures, and the like. Once the user selects the type, it will scan the user's requested biometric feature at 846 and update the user's identity locally at 847 before sending an update biometric identity request to the server 14 at 848. The mobile communication application will then return to the idle state at 422. If the User did not select to add/update a biometric profile at 842, the mobile communication application will determine if the user selected to add a passive user to the whitelist/blacklist at 850. If so, the mobile communication application will display a list of accumulated passive users the system identified at 852 and prompt the User to select the Passive User they wish to add to the whitelist/blacklist at 854. The mobile communication application will then send a Passive User Whitelist/Blacklist Request to the server 14 at 856 before returning to the idle state at 422.

Open Communication Devices/Users:

If the User did not select to add a Passive User to the Whitelist/Blacklist at 850 the mobile communication application will check if a User selected Open Channel to Device at 858. This would open a communication channel between the mobile communication application and the requested device, such as a domestic device 12, wearable device 17, or hearing aid device 15. If so, the mobile communication application will send an Open Communication with Device Request to the server 14 at 860 before returning to the idle state at 422. If the user did not select to open a communication channel with a device, the mobile communication application will check if the user selected Open Channel to Phone at 862. This would open a communication channel between the current phone 22 and the requested phone 22 connected to the system 10. If so, the mobile communication application will send an Open Communication with Phone Request to the server 14 at 864 before returning to the idle state at 422. If not, the mobile communication application will determine if the User selected Open Channel with User(s) at 866. Selecting this option would cause the server 14 to check the user location log to find which device [12,22, 17, 15] is closest to the requested user and open a communication channel with said device. If so, the mobile communication application will send an Open Communication with User Request to the server 14 at 868 before returning to the idle state at 422.

Calls:

If the user did not select to open a channel with a specified user at 866, the mobile communication application will determine if the User selected to import contacts from their mobile device 22 at 870. If so, the user will be able to select which contacts they wish to import at 872. The mobile communication application will then import those contacts locally from the mobile device 22 at 874 and then send an Update Contact Request to the server 14 before returning to the idle state at 422. If not, the mobile communication application will determine if the user selected to update their mobile contact permissions at 876. If so, the user will be prompted to update the contact's permissions at 878, for example if they are able to communicate over the system 10 when they call the User's mobile device 22, and then the mobile communication application will send an update contact permissions request to the server 14 at 880 before returning to the idle state at 422. If the user did not select that they wanted to update contact permissions, the mobile communication application will determine if the user is receiving an inbound call at 882. If so, the mobile communication application will send a Call Request to the server 14 at 884 and return to the idle state at 422. If the user rather begins an outbound call at 886, the mobile communication application will send a Call Request to the server 14 at 884 and return to the idle state at 422. If not, the mobile communication application will check if it received an Answer Call Request from a Device [12, 17, 15] at 888. If so, the mobile communication application will connect the call over the telephone network at 890 and forward the contents of the call to the requesting Device [12, 17, 15] for the duration of the call at 892 and return to the idle state at 422. If the mobile communication application had previously received a Call Request from a Device at 888 and the mobile communication application determines that the call is still connected at 894, the mobile communication application will continue to forward the communication to the device [12, 17, 15] for the duration of the call and return to the idle state at 422.

If the mobile communication application determines that a call is not connected at 894 the mobile communication application next determines if the user selected voicemail playback at 432. If so, the mobile communication application retrieves the selected voicemail from local storage at 434, and plays the selected voicemail at 436 for the user. The mobile communication application then returns to the idle state at 422.

Proximity Communication:

If a user has not selected a voicemail, the mobile communication application then determines if the server 14 is broadcasting spoken communication at 438. If so, the mobile communication application will check if there are more than one user detected in the proximity of the mobile device 22 at 896. If so, the mobile communication application will determine if the proximity-based communication shutoff setting is enabled at 898. If so, the mobile communication application will close the communication channel in order to allow the users to communicate face to face without the aid of the mobile communication application at 900 and return to the idle state 422. If the user did not enable proximity-based communication shutoff, the mobile communication application will check if proximity-based audio playback mode is enabled at 902. If so, the mobile communication application will check if noise cancelling playback is enabled at 904. If so, the mobile device 22 will invert the sound waves of the speaking users in the direction of the listening user so as to mute the speaking user from the perspective of the listening user at 906. Regardless of whether noise cancelling playback is enabled at 904, the mobile communication application will determine if the user(s) in its proximity, based on their biometric identities, has customizable volume(s) set at 908. If so, the mobile communication application will adjust the mobile device's 22 speaker volume and microphone gain to the user's customized audio levels based on the distance to the user so as to provide an optimal volume for the intended user(s) at 910. If the user(s) did not set a customizable volume, the mobile communication application will adjust the speaker volume and microphone gain of the mobile device 22 to default levels to account for the distance to the intended user(s) at 912. The device will then playback the input audio at 914 and return to the idle state at 422.

If it is determined at 896 there are not multiple users detected in the proximity of the mobile device 22 the mobile communication application will determine if a single user is detected in proximity of the mobile device 22 at 916. If so, the mobile communication application will check if the intended user set a customizable volume at 918. If so, the mobile communication application will adjust the mobile device's 22 speaker volume and the microphone gain to the user-customized levels based on the user's distance to provide the best quality audio at 920. If the user did not set a customizable volume, the mobile communication application will set the mobile device's 22 speaker volume and the microphone gain to its default levels which are based on the distance to the intended user at 922. In either case, or in the case that a singular user is not detected in the proximity of the mobile device 22, the mobile communication application will enable the mobile device's 22 speaker at 440 and audibly broadcasts the received spoken communication received from the server 14. The mobile communication application then returns to the idle state at 422.

If the mobile communication application determines that the server 14 is not sending spoken communication at 438, then it determines if the user selected to transit audio communication at 442. It is understood that the mobile communication application could recognize the user's intent in any number of ways. For example, the mobile communication application could provide a button labeled "speak." A button could be a physical button or on a touchscreen device. Additionally, the mobile communication application could be responsive to a spoken command. If the mobile communication application determines the user does wish to send audio communication, it then enables the mobile device's 22 microphone and records the audio at 444.

Biometrically Identified User Communication:

After having recorded the audio at 444, the mobile communication application will check if biometric authentication is enabled at 924. If so, the mobile communication application will remove the audio from the audio stream that corresponds to individuals that are not biometrically identified as Users or Whitelisted Passive Users at 926.

Commotion:

In either case, the mobile communication application will then check the recorded audio to determine if it detects undesirable commotion at 928. Undesirable commotion may include commotion that is, for example, sexual or violent in nature. If the audio clip does include undesirable commotion the mobile communication application will immediately disable the mobile device's 22 microphone at 930 and delete the recorded audio clip at 932. The mobile communication application will then check if a user had previously opted in to shutting the system 10 off under this circumstance at 934. If so, the mobile communication application will send a disable system request to the server 14 at 936 and return to the idle state at 422. If a user had not opted in to a system 10 shut off when a device detects undesirable commotion, the mobile communication application will send a disable device request to the server 14 at 938 and return to the idle state at 422.

Audio Clarity:

If the mobile communication application does not detect undesirable commotion in the recorded audio, it will then filter the input of any background noise at 940. It then sends the spoken communication to the server 14 at 446. The server 14 is then responsible for broadcasting the audio communication to the proper device(s). The mobile communication application then returns to the idle state at 422.

If it is determined at 442 that the user is not attempting to send spoken communication, the mobile communication application determines if the user wishes to send a voicemail at 448. A voicemail is defined as spoken communication recorded and stored as an audio file that can be played at a later time. Similarly to sending spoken communication, the mobile communication application can recognize the user's intent in any number of ways, such as a button or voice command. If the user does wish to send a voicemail, the mobile communication application enables the digital mobile device's 22 microphone and records the audio at 450.

Biometrically Identified User Communication:

The mobile communication application then determines if biometric authentication is enabled at 950. If so, the mobile communication application will remove the audio from speaking individuals who are not biometrically identified as users or whitelisted passive users at 952. Next, or if biometric authentication is not enabled, the mobile communication application will filter background noise from the input audio at 954 before it sends the voicemail at 452 to the server 14. The server 14 will then proceeds to send the voicemail to all other mobile devices 22 connected to the server 14. The mobile communication application then returns to the idle state at 422.

If at 448 the user is not attempting to send a voicemail, the mobile communication application determines if the user wishes to delete a voicemail at 454. Similarly to sending spoken communication, the mobile communication application can recognize the user's intent in any number of ways such as a button or voice command. If the user does wish to delete a voicemail, the mobile communication application removes the voicemail from local storage at 456. The mobile communication application then returns to the idle state at 422.

If at 954 the user is not attempting to delete a voicemail, the mobile communication application determines if the user wishes to enable or disable at 458 a domestic device 12 or the system 10. Similarly to sending spoken communication, the mobile communication application can recognize the user's intent in any number of ways, such as a button or voice command. If the user does wish to enable or disable a domestic device 12 or the system 10, the mobile communication application sends the appropriate enable or disable command at 460 to the server 14. The mobile communication application then returns to the idle state at 422.

If at 458 the user is not attempting to enable or disable a domestic device 12 or the system 10, the mobile communication application determines if the digital mobile device 22 has received a voicemail at 462 from the server 14. If it has not, the mobile communication application returns to the idle state 422. If the digital mobile device 22 has received a voicemail from the server 14, the voicemail is stored in local storage and a notification is sent to the user at 464. The notification can take many forms, such as displaying a message on the screen, sending a text message or an email, or other various means of notification. Then, the mobile communication application returns to the idle state at 422.

Thus it can be seen that home mode provides a convenient and unconscious system for communication between members of a household. When the members are separated by distances, they can communicate bi-directionally through the spoken communication system without needing to take any overt action such as speaking an awake word. When the members come into close proximity, the home mode is interrupted until they again separate and the communication over the system resumes. If communication is either short or directed to only one household member, the awake word for that member can be spoken in order to initiate a be-directional conversation. Embodiments of the invention provide a spoken communication system that is both versatile and unrestricted geographically, yet maintains all communication by the users of the system isolated from capture by systems on the Internet, and helps ensure privacy and security. Such Internet systems tend to build databases of users habits and characteristics in order to market to the users and even potentially worse. By isolating the system from the interception by others on the Internet, the system provides privacy with exceptional functionality and versatility.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The invention claimed is:

1. A spoken communication system, comprising:
    a plurality of communication devices, at least some configured to be positioned within an occupied structure and being responsive to spoken communication to communicate that spoken communication to other communication devices and to receive spoken communications received by other of said communication devices, each of said communication devices comprising a processor, a microphone an audio output device and a communication circuit; and
    an internet connected server that is selectively in digital communication with said communication devices and adapted to receive a spoken audio stream request, said server responsive to receiving an audio stream request by opening communication channels with said communication devices that are connected with said server;
    wherein the server is adapted to receive spoken communication captured by one of said communication devices that is in communication with said server, wherein the server is adapted to send the spoken communication to all other communication devices in digital communication with the server over the open communication channels with the other communication devices, wherein communication channels are open among said communication devices that are connected with said server to communicate spoken communication among communication devices that are connected with said server;
    wherein the server is adapted when in a home mode to keep the communication channels open irrespective of the presence of speech over the communication channels; and
    wherein the server is adapted when not in the home mode to open the communication channels in response to a spoken awake word and to maintain the communication channels open only in the presence of speech over the communication channels.

2. The spoken communication system as claimed in claim 1 wherein said communication devices comprise at least one chosen from stationary domestic devices, wearable devices and hearing aid devices.

3. The spoken communication system as claimed in claim 2 wherein communication device comprises a hearing aid device and wherein said audio output device comprises at least one chosen from an analog device, a digital device and a bone conductive method of amplification.

4. The spoken communication system as claimed in claim 1 wherein the communication device is adapted to temporarily mute audio of speaking individuals by inverting the sound waves generated by the speaking individual's voice while amplifying the same audio to the user to prevent the user hearing the communication twice.

5. The spoken communication system as claimed in claim 1 wherein the system is adapted to mute said communication channels when said communication devices indicate that the at least two users are within a defined proximity to each other.

6. The spoken communication system as claimed in claim 1 wherein a communication device is adapted to enter a non-responsive state upon detecting specific types of commotion in order to prevent violent, sexual, or other undesirable sounds to be communicated over the system.

7. The spoken communication system as claimed in claim 1 wherein a communication device is adapted to place or receive an external telephone call.

8. The spoken communication system as claimed in claim 1, wherein each of said communication devices comprise at least one proximity sensor that is adapted to sense location of users relative to that communication device.

9. The spoken communication system as claimed in claim 8 wherein the system is adapted to mute said communication channel of a communication device in response to the at least one proximity sensor of that communication device indicating that more than one user is within a define proximity to that communication device.

10. The spoken communication system as claimed in claim 8 wherein the server is adapted to mute a communication from a communication device by inverting sound waves generated by the speaker of that communication device.

11. The spoken communication system as claimed in claim 8 wherein the system is adapted to invert the audio of a speaking user in the direction of the listening user in response to the at least one proximity sensors detecting that the speaking and listing users are within a defined proximity to each other in order to prevent the listening user from receiving the audio from both the speaking user directly and from the communication device audio output.

12. The spoken communication system as claimed in claim 8 wherein the system is adapted to detect a user's audio through more than one communication device in close proximity and only allow the communication device with the highest quality audio to send audio.

13. The spoken communication system as claimed in claim 8 wherein a communication device is adapted to detect a plurality of users within a defined proximity to that communication device and enter an audio playback mode wherein the communication device plays back the audio of each individual user while amplifying the audio.

14. The spoken communication system as claimed in claim 8 wherein the system is adapted to detect separation distance of a user from a communication device and the spoken communication volume and adjust input microphone gain in response to separation distance between the user and the communication device as indicated by the at least one proximity sensor of that communication device.

15. The spoken communication system as claimed in claim 14 wherein the system is adapted to adjust output audio device levels in response to the separation distance.

16. The spoken communication system as claimed in claim 1, wherein the system is adapted to determine identity of individual users at said communication devices.

17. The spoken communication system as claimed in claim 16 wherein the system is adapted to identify individuals at a communication device according to a biological feature of the individual.

18. The spoken communication system as claimed in claim 17 wherein the biological feature comprises at least one selected from gait, vocal output, iris image, facial image, eye movements, hand gestures, body gestures and finger print.

19. The spoken system as claimed at claim 17 wherein each communication device being responsive to spoken communication to capture the spoken communication from only authenticated users, and being capable of sending the spoken communication from an authenticated user to other communication devices and receiving spoken communication from other of said communication devices from only authenticated users, wherein users are identified according to the biological feature of the individual.

20. The spoken communication system as claimed in claim 19 wherein a user is an authorized user if on a whitelist of individuals and not an authorized user if on a blacklist of individuals.

21. The spoken communication system as claimed in claim 16 wherein the system will disable communication channels to a communication device closest to a user receiving a phone call from an individual on the blacklist of individuals.

22. The spoken communication system as claimed in claim 16 wherein the system is adapted to allow a user to open a communication channel from a communication device to a specific user at another communication device using the biological features sensed by the communication devices as a function of the communication devices closest to the specific user.

23. The spoken communication system as claimed in claim 22 wherein the system is adapted to allow a user to open communication channels from a communication device to a plurality of specific users at other communication devices using the biological feature sensed by the communication devices as a function of the communication devices closest to the specific users.

24. The spoken communication system as claimed in claim 23 wherein the system is further adapted to change the other communication devices that are communicating over an open communication channel in response to movement of the specific user or users.

25. A method of transferring spoken communication system with a plurality of communication devices, at least some configured to be positioned within an occupied structure each of said communication devices comprising a processor, a microphone an audio output device and a communication circuit, said communication devices being responsive to spoken communication to communicate that spoken communication to other communication devices and to receive spoken communications received by other of said communication devices and an internet connected server that is selectively in digital communication with said communication devices and adapted to receive a spoken audio stream request, said server responsive to receiving an audio stream request by opening communication channels with said communication devices that are connected with said server, wherein the server is adapted to receive spoken communication captured by one of said communication devices that is in communication with said server, wherein the server is adapted to send the spoken communication to all other communication devices in digital communication with the server over the open communication channels with the other communication devices, wherein communication channels are open among said communication devices that are connected with said server to communicate spoken communication among communication devices that are connected with said server, said method comprising:

the server when in a home mode keeping the communication channels open irrespective of the presence of speech over the communication channels; and the server when not in the home mode opening the communication channels in response to a spoken awake word and maintains the communication channels only in the presence of speech over the communication channels.

26. The method as claimed in claim 25 wherein each of said communication devices comprise at least one proximity sensor and wherein each of said communication devices senses location of users relative to that communication device with said at least one proximity sensor.

27. The method as claimed in claim 25 wherein said system is adapted to determine identity of individual users at said communication devices.

\* \* \* \* \*